United States Patent
Raghavan et al.

(10) Patent No.: US 12,316,414 B2
(45) Date of Patent: May 27, 2025

(54) TECHNIQUES FOR BEAM CORRESPONDENCE WITH ADAPTIVE BEAM WEIGHTS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/744,670

(22) Filed: May 14, 2022

(65) Prior Publication Data

US 2023/0370132 A1   Nov. 16, 2023

(51) Int. Cl.
*H04B 7/06*   (2006.01)
*H04B 7/0456*   (2017.01)

(52) U.S. Cl.
CPC ......... *H04B 7/0617* (2013.01); *H04B 7/0456* (2013.01)

(58) Field of Classification Search
CPC .... H04B 7/0617; H04B 7/0456; H04B 7/088; H04B 7/0695
USPC ........................................................ 375/267
See application file for complete search history.

(56) References Cited

U.S. PATENT DOCUMENTS

| 2017/0164305 A1* | 6/2017 | Johansson | H01Q 3/28 |
| 2020/0169333 A1* | 5/2020 | Tiebout | H03F 3/19 |
| 2021/0028905 A1* | 1/2021 | Lei | H04W 72/23 |
| 2022/0104119 A1* | 3/2022 | Chiselko | H04W 52/0203 |

FOREIGN PATENT DOCUMENTS

WO    WO-2020101757 A1 *  5/2020 ........... H04B 7/0404

* cited by examiner

*Primary Examiner* — Leila Malek
(74) *Attorney, Agent, or Firm* — Holland & Hart LLP

(57) ABSTRACT

Methods, systems, and devices for wireless communications are described. A user equipment (UE) may communicate control signaling to a network entity comprising a time-varying beam correspondence indicator. In some examples, the network entity may transmit the time-varying correspondence indicator to the UE. In other examples, the UE may transmit the time-varying correspondence indicator to the network entity. The UE may select a first set of beam weight values for an uplink beam and a second set of beam weight values for a downlink beam based on the time-varying correspondence indicator. The UE may perform wireless communications with the network entity using the uplink beam according to the first set of beam weight values, the downlink beam according to the second set of beam weight values, or both.

26 Claims, 16 Drawing Sheets

TECHNIQUES FOR BEAM CORRESPONDENCE WITH ADAPTIVE BEAM WEIGHTS

FIELD OF TECHNOLOGY

The following relates to wireless communications, including techniques for beam correspondence with adaptive beam weight-based transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication networks, a network entity and a UE may use beamforming techniques to communicate.

SUMMARY

The described techniques relate to improved methods, systems, devices, and apparatuses that support techniques for beam correspondence with adaptive beam weights. Generally, a user equipment (UE), a network entity, or both, may flexibly determine when to maintain beam correspondence, and when to allow the UE to select beam weights for different beam forming schemes without maintaining beam correspondence. For instance, the UE may transmit capability signaling to the network entity, which may indicate dynamic beam weight capabilities of the UE. In some examples, the capability information may include an indication of amplitude and/or phase quantization levels supported by the UE. The network entity may indicate a beam correspondence present mode or beam correspondence absent mode (e.g., based on the UE capability information) by transmitting a beam correspondence indicator to the UE. In some examples, the UE may autonomously select a beam correspondence mode (e.g., instead of transmitting capability information and/or without instruction from the network entity), and may transmit a beam correspondence mode indicator to the network entity, which may indicate the beam correspondence present mode or the beam correspondent absent mode.

If the UE is operating in the beam correspondence present mode, the UE may derive beam weights for an uplink beam based on the physical layer measurements associated with the beam weights for a downlink beam. In the beam correspondence absent mode, the UE may separately determine the beam weights for the uplink beam and the downlink beam (e.g., based on separate beam sweeping procedures), such that the UE may perform separate beamforming communications on uplink and downlink according to different beamforming schemes. The UE may select the beam weights based on the beam correspondence mode indicator transmitted by the UE or the network entity. Therefore, if the UE is operating in beam correspondence present mode, the UE may maintain beam correspondence. If the UE is operating in beam correspondence absent mode, the UE may flexibly select beamforming schemes without maintaining beam correspondence by prioritizing uplink signaling or downlink signaling based on traffic patterns, mobility, use case based on performed applications, or types and nature of blockages encountered in communications. The UE and the network entity may flexibility determine whether to maintain beam correspondence or not, based on one or more conditions, traffic patterns, etc.

A method for wireless communications at a UE is described. The method may include communicating control signaling including a time-varying beam correspondence mode indicator, selecting, based on the time-varying beam correspondence mode indicator, a first set of beam weight values for an uplink beam and a second set of beam weight values for a downlink beam, and performing wireless communications with a network entity using the uplink beam according to the first set of beam weight values, the downlink beam according to the second set of beam weight values, or both.

An apparatus for wireless communications at a UE is described. The apparatus may include a processor, memory coupled with the processor, and instructions stored in the memory. The instructions may be executable by the processor to cause the apparatus to communicate control signaling including a time-varying beam correspondence mode indicator, select, based on the time-varying beam correspondence mode indicator, a first set of beam weight values for an uplink beam and a second set of beam weight values for a downlink beam, and perform wireless communications with a network entity using the uplink beam according to the first set of beam weight values, the downlink beam according to the second set of beam weight values, or both.

Another apparatus for wireless communications at a UE is described. The apparatus may include means for communicating control signaling including a time-varying beam correspondence mode indicator, means for selecting, based on the time-varying beam correspondence mode indicator, a first set of beam weight values for an uplink beam and a second set of beam weight values for a downlink beam, and means for performing wireless communications with a network entity using the uplink beam according to the first set of beam weight values, the downlink beam according to the second set of beam weight values, or both.

A non-transitory computer-readable medium storing code for wireless communications at a UE is described. The code may include instructions executable by a processor to communicate control signaling including a time-varying beam correspondence mode indicator, select, based on the time-varying beam correspondence mode indicator, a first set of beam weight values for an uplink beam and a second set of beam weight values for a downlink beam, and perform wireless communications with a network entity using the uplink beam according to the first set of beam weight values, the downlink beam according to the second set of beam weight values, or both.

In some examples of the method, apparatuses, and non-transitory computer-readable medium described herein, communicating the control signaling may include operations, features, means, or instructions for receiving the time-varying beam correspondence mode indicator from the network entity indicating that the UE may be instructed to implement beam correspondence in signaling or may be permitted to refrain from implementing beam correspondence.

Some examples of the method, apparatuses, and non-transitory computer-readable medium described herein may further include operations, features, means, or instructions for transmitting capability information indicating that the UE supports non-codebook-based beam weights different from codebook-based beam weights, and may be capable of dynamically switching between two beam correspondence modes, where receiving the time-varying beam correspondence mode indicator may be based on transmitting the capability information.

Some examples of the method, apparatuses, and non-transitory computer-readable medium described herein may further include operations, features, means, or instructions for transmitting, in the capability information, an indication of a set of multiple supported beam weights including the first set of beam weight values and the second set of beam weight values.

In some examples of the method, apparatuses, and non-transitory computer-readable medium described herein, the first set of beam weight values, the second set of beam weight values, or both, may be associated with phase control, amplitude control, or both and the phase control, amplitude control, or both, may be associated with respective quantization levels available in the hardware at the UE.

Some examples of the method, apparatuses, and non-transitory computer-readable medium described herein may further include operations, features, means, or instructions for receiving an indication of a number of bits associated with the respective quantization levels.

Some examples of the method, apparatuses, and non-transitory computer-readable medium described herein may further include operations, features, means, or instructions for transmitting an indication of a number of bits associated with the respective quantization levels.

In some examples of the method, apparatuses, and non-transitory computer-readable medium described herein, communicating the control signaling may include operations, features, means, or instructions for transmitting the time-varying beam correspondence mode indicator to a network entity.

In some examples of the method, apparatuses, and non-transitory computer-readable medium described herein, communicating the time-varying beam correspondence mode indicator may include operations, features, means, or instructions for transmitting the time-varying beam correspondence mode indicator based on a traffic pattern, a traffic load, mobility information, a performance requirement, or any combination thereof.

In some examples of the method, apparatuses, and non-transitory computer-readable medium described herein, the time-varying beam correspondence mode indicator includes an indication that beam correspondence may be absent and the first set of beam weight values may be different from and cannot be derived from the second set of beam weight values.

Some examples of the method, apparatuses, and non-transitory computer-readable medium described herein may further include operations, features, means, or instructions for performing an uplink beam training procedure based on the indication that beam correspondence may be absent, where selecting the first set of beam weight values for the uplink beam may be based on the uplink beam training procedure.

Some examples of the method, apparatuses, and non-transitory computer-readable medium described herein may further include operations, features, means, or instructions for selecting the first set of beam weight values may be based on a traffic pattern, a traffic load, mobility information, performance requirements, or any combination thereof.

In some examples of the method, apparatuses, and non-transitory computer-readable medium described herein, the time-varying beam correspondence mode indicator includes an indication that beam correspondence may be present and the first set of beam weight values may be derived from the second set of beam weight values.

In some examples of the method, apparatuses, and non-transitory computer-readable medium described herein, selecting the first set of beam weight values and the second set of beam weight values may include operations, features, means, or instructions for selecting one or more beam weights associated with phase control, and setting amplitude control to an on configuration or an off configuration.

Some examples of the method, apparatuses, and non-transitory computer-readable medium described herein may further include operations, features, means, or instructions for setting the amplitude control to the on configuration or the off configuration may be based on one or more conditions satisfying a performance threshold.

Some examples of the method, apparatuses, and non-transitory computer-readable medium described herein may further include operations, features, means, or instructions for receiving an indication of the performance threshold from the network entity.

In some examples of the method, apparatuses, and non-transitory computer-readable medium described herein, the performance threshold may be associated with a channel environment, a difference between uplink power and downlink power, a difference between uplink performance and downlink performance, or any combination thereof.

A method for wireless communications at a network entity is described. The method may include communicating control signaling including a time-varying beam correspondence mode indicator, selecting, based on the time-varying beam correspondence mode indicator, a beam correspondence mode, and performing wireless communications with a UE using an uplink beam, a downlink beam, or both, according to the beam correspondence mode.

An apparatus for wireless communications at a network entity is described. The apparatus may include a processor, memory coupled with the processor, and instructions stored in the memory. The instructions may be executable by the processor to cause the apparatus to communicate control signaling including a time-varying beam correspondence mode indicator, select, based on the time-varying beam correspondence mode indicator, a beam correspondence mode, and perform wireless communications with a UE using an uplink beam, a downlink beam, or both, according to the beam correspondence mode.

Another apparatus for wireless communications at a network entity is described. The apparatus may include means for communicating control signaling including a time-varying beam correspondence mode indicator, means for selecting, based on the time-varying beam correspondence mode indicator, a beam correspondence mode, and means for performing wireless communications with a UE using an uplink beam, a downlink beam, or both, according to the beam correspondence mode.

A non-transitory computer-readable medium storing code for wireless communications at a network entity is described. The code may include instructions executable by a processor to communicate control signaling including a time-varying beam correspondence mode indicator, select, based on the time-varying beam correspondence mode indicator, a beam correspondence mode, and perform wireless communications with a UE using an uplink beam, a downlink beam, or both according to the beam correspondence mode.

In some examples of the method, apparatuses, and non-transitory computer-readable medium described herein, communicating the control signaling may include operations, features, means, or instructions for transmitting the time-varying beam correspondence mode indicator to the UE, the time-varying beam correspondence mode indicator indicating that the UE may be instructed to implement beam correspondence in signaling or may be permitted to refrain from implementing beam correspondence.

Some examples of the method, apparatuses, and non-transitory computer-readable medium described herein may further include operations, features, means, or instructions for receiving capability information indicating that the UE supports non-codebook-based beam weights different from codebook-based beam weights, and may be capable of dynamically switching between two beam correspondence modes, where transmitting the time-varying beam correspondence mode indicator may be based on transmitting the capability information.

Some examples of the method, apparatuses, and non-transitory computer-readable medium described herein may further include operations, features, means, or instructions for receiving, in the capability information, an indication of a set of multiple supported beam weights including a first set of beam weight values associated with an uplink beam and a second set of beam weight values associated with a downlink beam.

In some examples of the method, apparatuses, and non-transitory computer-readable medium described herein, the uplink beam may be associated with a first set of beam weight values and the downlink beam may be associated with a second set of beam weight values, the first set of beam weight values, the second set of beam weight values, or both, may be associated with phase control, amplitude control, or both, and the phase control, amplitude control, or both, may be associated with respective quantization levels available in the hardware at the UE.

Some examples of the method, apparatuses, and non-transitory computer-readable medium described herein may further include operations, features, means, or instructions for transmitting an indication of a number of bits associated with the respective quantization levels.

Some examples of the method, apparatuses, and non-transitory computer-readable medium described herein may further include operations, features, means, or instructions for receiving an indication of a number of bits associated with the respective quantization levels.

In some examples of the method, apparatuses, and non-transitory computer-readable medium described herein, communicating the time-varying beam correspondence mode indicator may include operations, features, means, or instructions for receiving the time-varying beam correspondence mode indicator based on a traffic pattern, a traffic load, mobility information, performance requirements, or any combination thereof.

In some examples of the method, apparatuses, and non-transitory computer-readable medium described herein, the time-varying beam correspondence mode indicator includes an indication that beam correspondence may be absent and the uplink beam may be associated with a first set of beam weight values different from and that cannot be derived from a second set of beam weight values associated with the downlink beam.

In some examples of the method, apparatuses, and non-transitory computer-readable medium described herein, the time-varying beam correspondence mode indicator includes an indication that correspondence may be present and the uplink beam may be associated with a first set of beam weight values and the downlink beam may be associated with a second set of beam weight values, where the first set of beam weight values may be derived from the second set of beam weight values.

DETAILED DESCRIPTION

Figure 1:
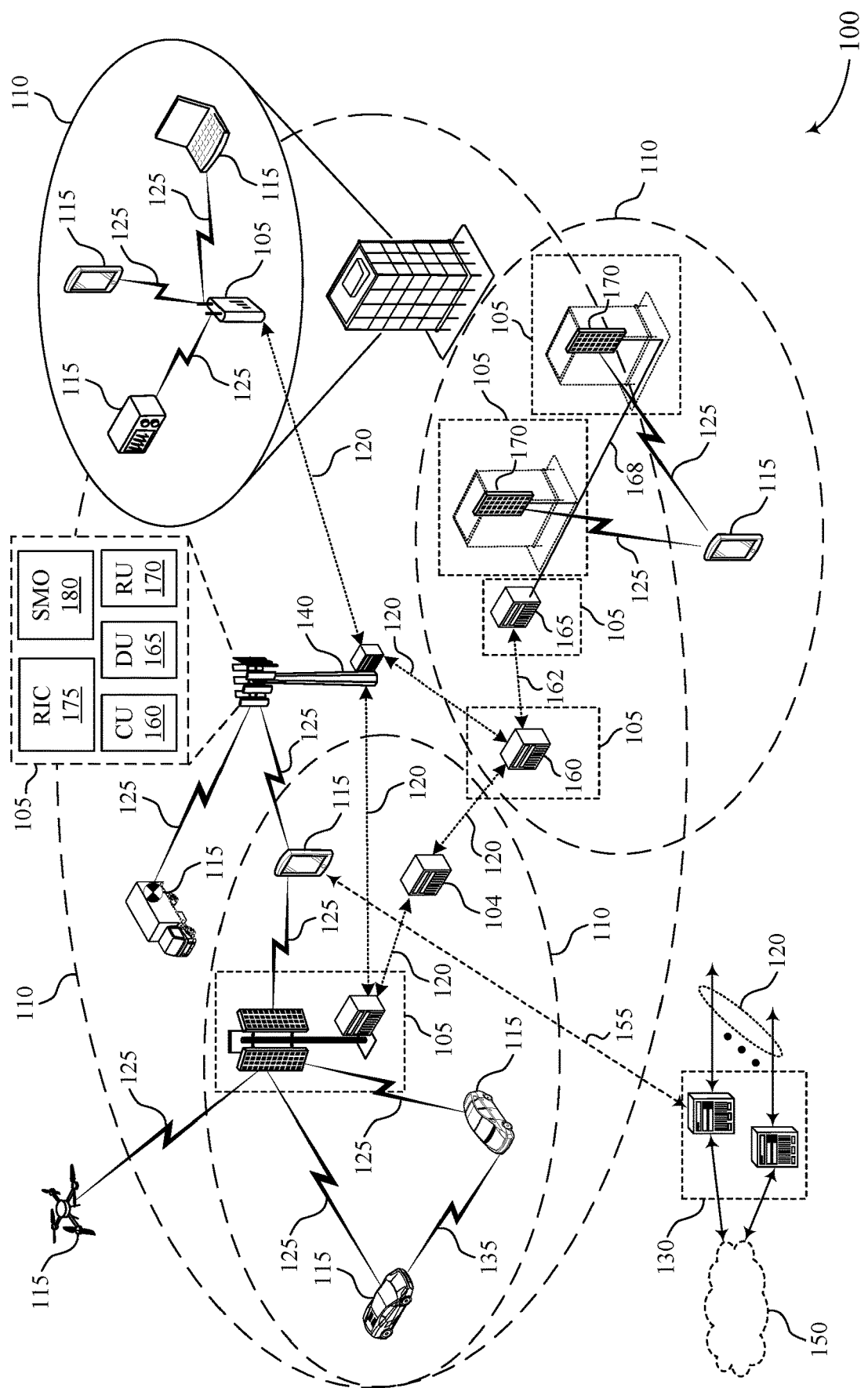
FIG. 1 illustrates an example of a wireless communications system that supports techniques for beam correspondence with adaptive beam weights in accordance with one or more aspects of the present disclosure.

Wireless communications systems may incorporate beamforming procedures to support uplink and downlink communication between a user equipment (UE) and one or more network entities. In some examples, the UE may perform dynamic beam weight-based procedures, which may allow for the UE to select different beam weights in an adaptive manner. For example, the UE may dynamically select beam weights associated with different beam forming schemes. The use of more flexible and dynamically selected beam weights may allow the UE to address a variety of changing circumstances. For instance, dynamic beam weights may support wider angular spreads for a cluster in the channel environment, or may support (e.g., may emulate) multi-beam effects such as multiple lobes across multiple clusters, side lobe control, addressing blockages and specific use cases, and polarization specific impairments at the UE. In some examples, non-adaptive beam weights-based procedures may target the steering of a main lobe towards specific/pre-determined directions in the beamspace corresponding to energy selection across different dominant clusters in the channel environment.

Different sets of beam weights may be associated with different beamforming schemes, such as amplitude control, phase control, or a combination of both. Different beamforming schemes may have different impacts on uplink and downlink signaling. For example, selecting beam weights to perform amplitude control may improve downlink performance, but may degrade uplink performance due to loss in effective isotropic radiated power (EIRP). Therefore, dynamic (e.g., non-codebook-based) beam forming procedures may allow the UE flexibility in selecting the beam weights, but beamforming schemes within dynamic beam forming may result in performance degradation or a loss in beam correspondence. Beam correspondence may be associated with the UE deriving beam weights for a beam (e.g., an uplink beam) based on physical layer measurements associated with the beam weights for another beam (e.g., a downlink beam). Suspension of beam correspondence may result in increased latency and increased overhead because the UE may have to perform separate uplink and downlink beam selection procedures. However, in some examples, the UE may be able to improve uplink signaling or downlink signaling by selecting a particular beamforming scheme (e.g., even if that beamforming scheme may result in loss of beam correspondence). By inflexibly maintaining beam correspondence across all scenarios, the UE may sacrifice uplink performance, downlink performance, or both. However, by abandoning beam correspondence altogether, the UE may experience increased latency, increased signaling overhead, and degraded performance in some scenarios.

Techniques are described herein for dynamically selecting beam weights over time. The UE, the network entity, or both, may flexibly determine when to maintain beam correspondence, and when to allow the UE to select beam weights for beam forming schemes without maintaining beam correspondence. For example, the UE may transmit capability signaling to the network entity, which may indicate dynamic beam weight capabilities of the UE. The dynamic beam weight capabilities may include an indication of supported beam forming schemes (e.g., sets of beam weights that the UE supports for implementing the supported beam forming schemes). In some examples, the capability information may include an indication of quantization levels available in the hardware at the UE (e.g., a number of bits (B) of quantization) for phase control or amplitude control, or a combination of both. The respective quantization levels may be subject to calibration constraints and accuracy around nominal values of quantization.

The network entity may indicate a beam correspondence present mode or beam correspondence absent mode through control signaling (e.g., including a beam correspondence indicator), which may indicate whether the UE will maintain beam correspondence and may be based on one or more of traffic pattern, mobility, use case, or performance requirements. In some cases, the control signaling may be transmitted based on the capability signaling. In some examples, the UE may autonomously determine when to maintain beam correspondence, and may transmit the beam correspondence indicator to the network entity, which may indicate the beam correspondence present mode or the beam correspondent absent mode.

In the beam correspondence present mode, the UE may derive beam weights for an uplink beam based on the physical layer measurements associated with the beam weights for a downlink beam. In the beam correspondence absent mode, the UE may determine the beam weights for the uplink beam and the downlink beam separately. The UE may select the beam weights based on the beam correspondence mode indicator transmitted by the UE or the network entity. Therefore, if the UE is operating in beam correspondence present mode, the UE may maintain beam correspondence, which may result in decreased latency, more robustness to address blockages, and decreased overhead. If the UE is operating in beam correspondence absent mode, the UE may flexibly select beamforming schemes without maintaining beam correspondence by prioritizing uplink signaling or downlink signaling based on traffic patterns, mobility, use case, or blockages, which may result in improved throughput, decreased latency, and improved user experience.

Aspects of the disclosure are initially described in the context of wireless communications systems. Aspects of the disclosure are illustrated and described in reference to a wireless communications system and a process flow. Aspects of the disclosure are further illustrated by and described with reference to apparatus diagrams, system diagrams, and flowcharts that relate to techniques for beam correspondence with adaptive beam weights.

FIG. 1 illustrates an example of a wireless communications system 100 that supports techniques for beam correspondence with adaptive beam weights in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLO-NASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network entity 105 (e.g., a base station) without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for beam correspondence with adaptive beam weights as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or a combination of both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARD) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples (e.g., in upper millimeter wave (mmW) frequency bands), the UE 115 and the network entity 105 may communicate by using beamforming procedures to enable uplink and downlink communication on directional beams. Carrier frequencies utilized by the UE 115 and the network entity 105 may include multiple bands (e.g. a 28 GHz band, a 39 GHz band, etc.). In some examples, wireless communication system 100 may support upper millimeter wave (e.g., greater than 52.6 GHz) bands, or sub-Terahertz bands (e.g., greater than 114.25 GHz) bands, among other examples. In some examples, the UE 115 may perform analog beamforming, hybrid beamforming, or dynamic beamforming procedures. Analog beamforming procedures and hybrid beamforming procedures may be directed to steering beams in a limited number of directions (e.g., directional beams), which may be referred to as a static codebook approach (e.g., a static number of possible beam weights). The static number of possible beam weights may be associated with different phases across antenna elements, which may be configured by phase shifters.

Dynamic beamforming may allow for the UE 115 to select different beam weights in an adaptive manner. For example, the UE 115 may dynamically select beam weights associated with different beamforming schemes (e.g., the UE 115 may be able to configure different phases, different amplitudes, or both for signal transmission). The use of more flexible and dynamically selected beam weights may allow the UE 115 to address a variety of changing circumstances. For instance, dynamic (e.g., adaptive) beam weights may support wider angular spreads for a cluster in the channel environment, multi-beam effects such as multiple lobes across multiple clusters, side lobe control, addressing blockages and specific use cases, and polarization specific impairments at the UE 115. In dynamic beamforming, the UE 115 may determine (e.g., in real time) beam weights by communicating with the network entity 105, while in analog beamforming, the beam weights may be pre-configured (e.g., designed a priori) at the UE 115. In some examples, dynamic beam weights may be determined (e.g., learned) through downlink transmissions and used for uplink transmissions.

Different sets of beam weights in dynamic beamforming may be associated with different beamforming schemes, such as amplitude control, phase control, or a combination of both. Different beamforming schemes may have different impacts on uplink and downlink signaling. For example, selecting beam weights to perform amplitude control may improve downlink performance, but may degrade uplink performance due to loss in EIRP. For example, performing amplitude control on downlink signaling may distort the downlink signal and the noise associated with the downlink signal equally, so that the signal-to-noise (SNR) ratio may remain consistent (e.g., comparable to analog beamforming). However, the use of amplitude control for adaptive beam weights may lead to EIRP loss for uplink communications as the power amplifiers used with different antenna elements may be tuned below the saturated power (Psat) value corresponding to the linear operational region of the power amplifier. Additionally, performing different beamforming schemes (e.g., generating beams according to amplitude control, phase control, or a combination of both) may result in a loss in beam correspondence. That is, some beamforming schemes, or the selection of beam weights corresponding to different beamforming schemes, may result in a loss of beam correspondence at a wireless device such as the UE 115. Therefore, dynamic beam-forming procedures may allow the UE 115 flexibility in selecting the beam weights, but beamforming schemes in dynamic beam forming may result in performance degradation for uplink signaling or downlink signaling, or a loss in beam correspondence, or a combination thereof.

Millimeter wave beamforming (e.g., using fixed a priori pre-designed analog beamforming codebooks) at both the UE 115 and the network entity 105 may assume only a single beamforming scheme (e.g., phase shifter-only control). Phase shifter control may be used to maintain EIRP regulations for uplink transmissions via beam correspondence (e.g., using power amplifiers below a peak rating may lead to EIRP reduction). Usage of amplitude control may also complicate power density characterization for regulatory constraints (e.g., MPE issues). However, in some examples, other beamforming schemes may provide benefits to uplink or downlink signaling (e.g., or both). For example, amplitude control beamforming may be useful despite an EIRP loss to uplink transmissions. Amplitude control may be supported (e.g., at both hardware and software capabilities) by UEs 115 for some wireless communications. (e.g., next generation millimeter wave as well as beyond such frequencies). However, when amplitude control is used for downlink signaling, amplitude control signaling may distort both signal and noise equally, resulting in an SNR that remains comparable to the use of other beamforming schemes (e.g., phase only control). However, for uplink signaling, a loss in EIRP may result in suspended beam correspondence. Loss of beam correspondence may lead to an increase in latency (e.g., resulting from separate uplink and downlink beamforming training), less robustness to blockages, increased signaling overhead (e.g., control signaling overhead), etc.

Thus, it may be beneficial for the UE 115 to support multiple beamforming schemes (e.g., amplitude control, phase control, or a combination of both, etc.) to take advantage of the benefits of each individual beamforming scheme where applicable. However, it may also be beneficial for the UE 115 to maintain beam correspondence in some scenarios, to avoid the increased latency, signaling overhead, etc., resulting from loss of beam correspondence. Utilizing general sets of adaptive beam weights may support the use of multiple beamforming schemes.

Techniques are described herein for dynamically selecting beam weights over time. The UE 115, the network entity 105, or both, may flexibly determine when to maintain beam correspondence, and when to allow the UE to select beam weights for beam-forming schemes without maintaining beam correspondence. For example, the UE 115 may transmit capability signaling to the network entity 105, which may indicate dynamic beam weight capabilities of the UE 115. The dynamic beam weight capabilities may include an indication of supported beam forming schemes (e.g., sets of beam weights that the UE 115 supports for implementing the supported beam-forming schemes). In some examples, the capability information may include an indication of quantization levels available in the hardware at the UE 115 (e.g., a number of bits (B) of quantization) for phase control or amplitude control, or a combination of both. The respective quantization levels may be subject to calibration constraints and accuracy around nominal values of quantization. The network entity 105 may indicate a beam correspondence present mode or beam correspondence absent mode through control signaling (e.g., including a beam correspondence indicator), which may indicate whether the UE 115 will maintain beam correspondence and may be based on one or more of traffic pattern, mobility, use case, or performance requirements. In some cases, the control signaling may be transmitted based on the capability signaling. In some examples, the UE 115 may autonomously determine when to maintain beam correspondence, and may transmit the beam correspondence indicator to the network entity, which may indicate the beam correspondence present mode or the beam correspondent absent mode.

In the beam correspondence present mode, the UE 115 may derive beam weights for an uplink beam based on the physical layer measurements associated with the beam weights for a downlink beam. In the beam correspondence absent mode, the UE 115 may separately determine the beam weights for the uplink beam and the downlink beam. The UE 115 may select the beam weights based on the beam correspondence mode indicator transmitted by the UE 115 or the network entity 105. Therefore, if the UE 115 is operating in beam correspondence present mode, the UE 115 may maintain beam correspondence. If the UE 115 is operating in beam correspondence absent mode, the UE 115 may flexibly select beamforming schemes without maintaining beam correspondence by prioritizing uplink signaling or downlink signaling based on traffic patterns, mobility, use case, or blockages.

Figure 2:
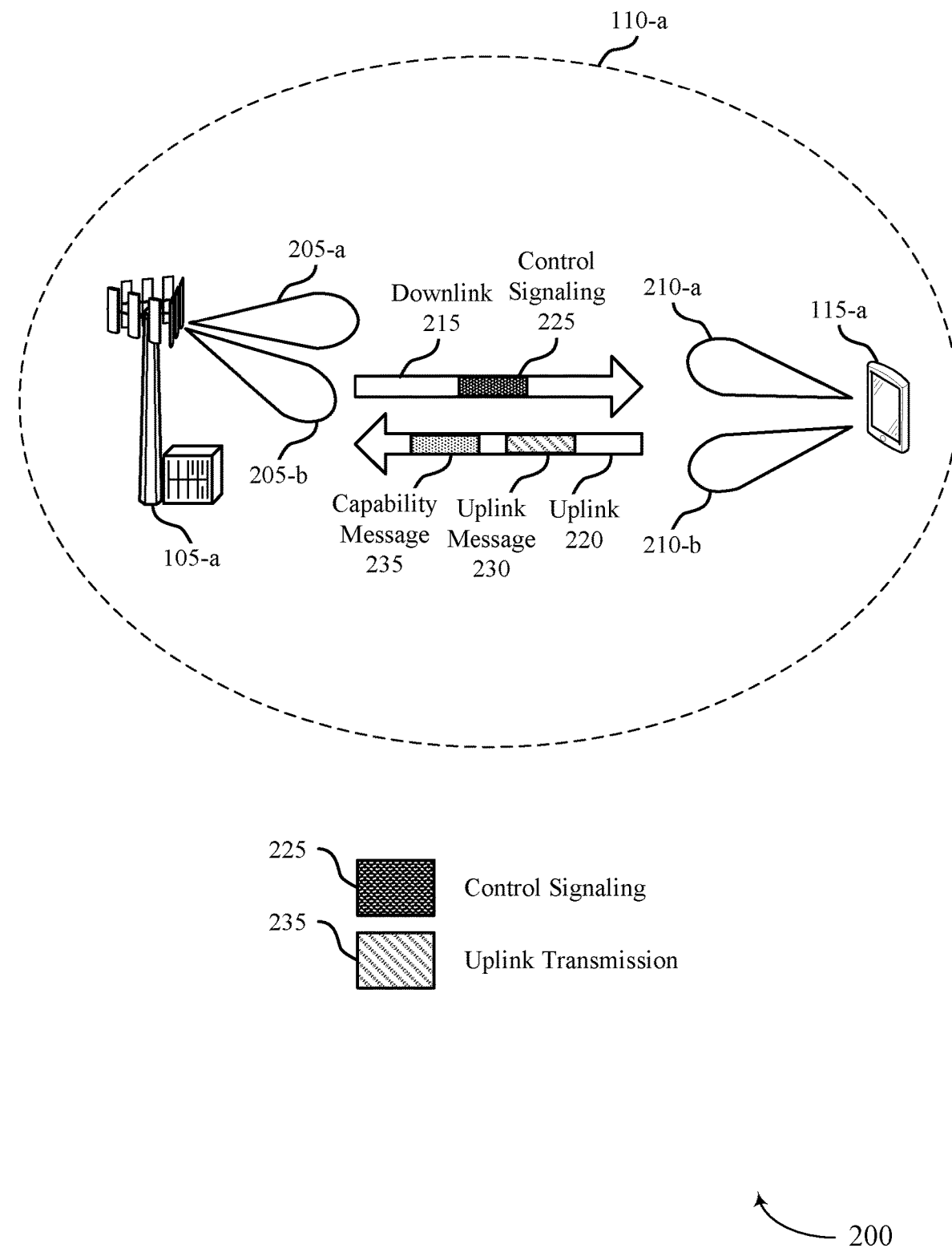
FIG. 2 illustrates an example of a wireless communications system that supports techniques for beam correspondence with adaptive beam weights in accordance with one or more aspects of the present disclosure.

FIG. 2 illustrates an example of a wireless communications system 200 that supports techniques for beam correspondence with adaptive beam weights in accordance with one or more aspects of the present disclosure. In some examples, wireless communications system 200 may implement aspects of wireless communications system 100 and may include a UE 115-a and a network entity 105-a serving a coverage area 110-a, which may be examples of a UE 115 and a network entity 105 serving a coverage area 110 as described with reference to FIG. 1. The network entity 105-a and the UE 115-a may communicate with one The network entity 105-a and the UE 115-a may generate and communicate using one or more directional beams, such as beam 205-a, beam 205-b, beam 210-a, and beam 210-b.

In some examples, the UE 115-a (e.g., and the network entity 105-a) may support beam correspondence. For example, the UE 115-a may perform uplink communication on uplink 220 using uplink beam 210-b, and may perform downlink communications on downlink 215 using downlink beam 210-a. If the UE 115-a is operating in a beam correspondence present mode, then the UE 115-a may perform beam sweeping procedures, and may determine downlink beam 210-a based thereon. The UE may then derive the uplink beam 210-b based on the downlink beam 210-a (e.g., without having to perform a separate beam sweeping procedure). This may decrease latency for the UE 115-a and the wireless communications system 100 overall, and may also reduce control signaling as well as power consumption.

In some examples, the UE 115-a may perform beamforming with static or pre-configured beams 210 to communicate with the network entity 105-a. However, such static beamforming techniques may not allow for rapid or flexible adjustments to address or mitigate real-time issues. Dynamic beamforming (e.g., adjusting beam weights in real time beyond a pre-stored codebook) may allow for the UE 115 to select different beam weights for generating beams 210 in an adaptive manner. For example, the UE 115 may dynamically select beam weights associated with different beamforming schemes (e.g., the UE 115 may be able to configure different phases and different amplitudes for signal transmission). The use of more flexible and dynamically selected beam weights may allow the UE 115 to address a variety of changing circumstances. For instance, dynamic (e.g., adaptive) beam weights may support wider angular spreads for a cluster in the channel environment, emulate multi-beam effects such as multiple lobes across multiple clusters, side lobe control, addressing blockages and specific use cases, and polarization specific impairments at the UE 115. In dynamic beamforming, the UE 115 may determine (e.g., in real time) beam weights by communicating with the network entity 105, while in analog beamforming, the beam weights may be pre-configured (e.g., designed a priori) at the UE 115.

Different sets of beam weights in dynamic beamforming may be associated with different beamforming schemes, such as amplitude control, phase control, or a combination of both. Different beamforming schemes may have different impacts on uplink and downlink signaling. For example, selecting beam weights to perform amplitude control may improve downlink performance, but may degrade uplink performance. Performing amplitude control on downlink signaling may distort the downlink signal and the noise associated with the downlink signal equally, such the signal-to-noise (SNR) ratio may remain consistent (e.g., comparable to analog beamforming) and the EIRP may remain constant. However, the use of amplitude control for adaptive beam weights may lead to EIRP loss for uplink communications. Additionally, performing different beamforming schemes (e.g., generating beams according to amplitude control, phase control, or a combination of both) may result in a loss in beam correspondence. That is, some beamforming schemes, or the selection of beam weights corresponding to different beamforming schemes, may result in a loss of beam correspondence at a wireless device such as the UE 115.

Phase shifter control may be used to maintain EIRP regulations for uplink transmissions via beam correspondence (e.g., using power amplifiers below a peak rating may lead to EIRP reduction). Usage of amplitude control may also complicate power density characterization for regulatory constraints (e.g., MPE issues). However, in some examples, other beamforming schemes may provide benefits to uplink or downlink signaling (e.g., or both). For example, amplitude control beamforming may be useful despite an EIRP loss to uplink transmissions. Amplitude control may be supported (e.g., at both hardware and software capabilities) by UEs 115 for some wireless communications (e.g., next generation millimeter wave modems). However, when amplitude control is used for downlink signaling, amplitude control signaling may distort both signal and noise equally, resulting in an SNR that remains comparable to the use of other beamforming schemes (e.g., phase only control). However, for uplink signaling, a loss in EIRP may result in suspended beam correspondence. Loss of beam correspondence may lead to an increase in latency (e.g., resulting from separate uplink and downlink beamforming training), less robustness to blockages, increased signaling overhead (e.g., control signaling overhead), etc.

In some examples, the UE may support multiple beamforming schemes, which may include amplitude and phase control, phase-only control, phase control plus an on/off threshold (e.g., phase control and amplitude control that can be turned on or off without any additional granularity), and an infinite precision beamforming scheme. For uplink communications on the uplink 220, an amplitude control beamforming scheme may result in significant loss in performance. For downlink communications, an infinite precision beamforming scheme may lead to significant loss in performance. In some examples, a phase-only control beamforming scheme may maintain EIRP above a threshold level. In some examples, a phase control plus on-off amplitude control beamforming scheme (e.g., implementing amplitude control in combination with phase control if an optional threshold is satisfied, as selected for downlink communication) may result relatively good performance on both uplink and downlink signaling (e.g., may be robust for both uplink and downlink, with no loss in beam correspondence).

Thus, it may be beneficial for the UE 115 to support multiple beamforming schemes (e.g., amplitude control, phase control, a combination of both, etc.) to take advantage of the benefits of each individual beamforming scheme where applicable. However, it may also be beneficial for the UE 115 to maintain beam correspondence in some scenarios, to avoid the increased latency, signaling overhead, etc., resulting from loss of beam correspondence. Utilizing general sets of adaptive beam weights may support the use of multiple beamforming schemes.

In some examples, as described herein, a wireless device (e.g., a UE 115-a, or a network entity 105-a) may dynamically select beam weights for generating uplink and downlink beams. Further, the UE 115-a and the network entity 105-a may communicate to determine when the UE 115-a is to maintain beam correspondence (e.g., even at the expense of uplink performance or downlink performance), and when the UE 115-a is permitted to lose beam correspondence (e.g., to improve uplink performance or downlink performance, or in response to traffic patterns, even at the expense of latency and increased signaling overhead resulting from loss of beam correspondence). In such a flexible and time-varying scenario, the UE 115-a may be able to improve wireless communication in specific scenarios (e.g., may improve uplink performance when uplink traffic is heavy or high priority, or downlink performance when downlink traffic is heavy or high priority), and may reduce latency and signaling overhead without impacting overall signal quality in other scenarios.

In some examples, the UE 115-a may report, to the network entity 105-a, its capability to use adaptive (e.g., time-varying or dynamic) beam weights. The UE 115-a may then use the different beam weights to use various beamforming schemes. For example, the UE 115-a may report, to the network entity 105-a, its capability to support both amplitude and/or phase control beamforming schemes. In some examples, the supported beamforming schemes may be associated with different quantizations. For example, phase control beamforming, or amplitude control beamforming, may be performed according to a certain quantization level. The quantization level may be represented by a number of bits B (e.g., a B-bit quantization level). The quantization level may be uniform, or non-uniform over a range of values. For example, for amplitude control, the UE 115-*a* may perform amplitude control over a range of amplitudes from the smallest value to a largest value. The range of amplitude may be divided by a step size. Quantization levels supported by the UE 115-*a* for a given beamforming scheme may be available in the hardware of the UE 115-*a*, and may be subject to calibration constrains and an accuracy around a nominal value of quantization. For example, the quantization level may be indicated as a nominal value that aligns with a step size dividing the range of amplitudes, but may be subject to a range of accuracy (e.g., a range higher than and lower than the nominal value indicated by the quantization level). Phase control beamforming accuracy may be similar (e.g., but the error in phases over nominal values may not have a significant impact on performance) as the phase may be constrained to 0 to 360 degrees.

The UE 115-*a* may indicate, in a capability message 235 uplink 220. The capability message 235 may indicate that the UE 115-*a* is capable of supporting adaptive (e.g., time-varying) beam correspondence modes. The capability message 235 may also indicate a quantization level of the capability (e.g., for one or more beamforming schemes). In some examples, the network entity 105-*a* may configure the value of B for the B-bit quantization level. In some examples, the UE may indicate the value of B in the capability message 235.

In some examples, the network entity 105-*a* may output, and the UE 115-*a* may receive, a beam correspondence mode indicator. The beam correspondence mode indicator may indicate that the UE has to either implement beam correspondence in signaling or is allowed to not implement beam correspondence in signaling. For example, in response to receiving the capability message 235 (e.g., or in response to a request from the UE 115-*a* for a particular beam correspondence mode), the network entity 105-*a* may transmit control signaling 225, which may include the time-varying beam correspondence mode indicator. That is, instead of configuring the UE 115-*a* to either always maintain beam correspondence, or not, the network entity 105-*a* may, over time, allow the UE 115-*a* to switch between selecting beam weights for beam 210-*a* and beam 210-*b* that are different (e.g., beam correspondence mode absent, resulting in loss of beam correspondence and selecting beam weights for beam 210-*b* that are derived from the beam weights of beam 210-*a* (e.g., beam correspondence mode present, resulting in beam correspondence).

If the beam correspondence mode indicator indicates beam correspondence present mode then the UE 115-*a* may operate in a beam correspondence present mode, ensuring that the same beamforming scheme is used for downlink and uplink communications (e.g., the same beam weights or derived beam weights for each of the beam 210-*a* and the beam 210-*b*). If the beam correspondence mode indicator indicates beam correspondence absent mode, then the UE 115-*a* may be allowed to operate in a beam correspondence absent mode, which may allow the UE 115-*a* to use different beam weights for downlink and uplink. In such examples, the UE 115-*a* may perform separate uplink beam training session and downlink beam training sessions (e.g., the UE 115-*a* may determine different sets of beam weights for each of the beam 210-*a* and the beam 210-*b*). In some examples, the UE 115-*a* may autonomously determine and transmit a dynamic (e.g., time-varying) beam correspondence mode indicator. That is, over time, the UE 115-*a* may determine whether it will operate in beam correspondence present mode or beam correspondence absent mode, and may indicate its current (e.g., or pending) beam correspondence mode to the network entity 105-*a* (e.g., in an uplink message 230). The UE may switch between beam correspondence present mode and beam correspondence absent mode dynamically based on traffic patterns, traffic loads, mobility, or performance requirements, among other examples. In some examples, the UE 115-*a* may transmit the beam correspondence mode indicator without instruction from the network entity 105-*a*.

Depending on which beam correspondence mode the UE 115-*a* operates in, the UE 115-*a* may select correct beam weights for uplink and downlink communications. If operating according to a beam correspondence present mode, the UE 115-*a* may use phase-only control, with amplitude set to on/off. For example, the UE 115-*a* may perform beamforming by applying phase control, and may turn amplitude control on or off according to whether a threshold is satisfied. For example, the UE 115-*a* may select an amplitude for amplitude control (e.g., in combination with the phase control) based on an estimated unquantized amplitude of an estimated beamforming vector exceeding a threshold. The estimated beamforming vector may be the dominant eigenvector of an estimated covariance matrix corresponding to the effective channel vector based on rank-1 transmissions/reception at the UE 115-*a*. In some cases, the UE 115-*a* may set the amplitude control to off. The threshold for amplitude binarization (e.g. on/off decision-making) may be selected based on configuration information transmitted by the network entity 105-*a*, or may be selected by the UE 115-*a*. The threshold may be a function of channel environment, uplink and downlink power differential, a difference in performance between uplink and downlink relative to a best dynamic beamforming scheme (e.g., from within a set of available beamforming schemes supported by the capability of the UE 115-*a*), or any combination thereof.

If the UE operates in beam correspondence absent mode (e.g., amplitude control optionally without having beam correspondence), then the UE 115-*a* may select a first set of beam weights for the uplink beam 210-*b*, and a second set of beam weights for the downlink beam 210-*a* (e.g., without deriving one set of beam weights from the other), and the two sets of beam weights may be different (e.g., the UE 115-*a* may use one beamforming scheme for uplink signaling and another beamforming scheme for downlink signaling).

Figure 3:
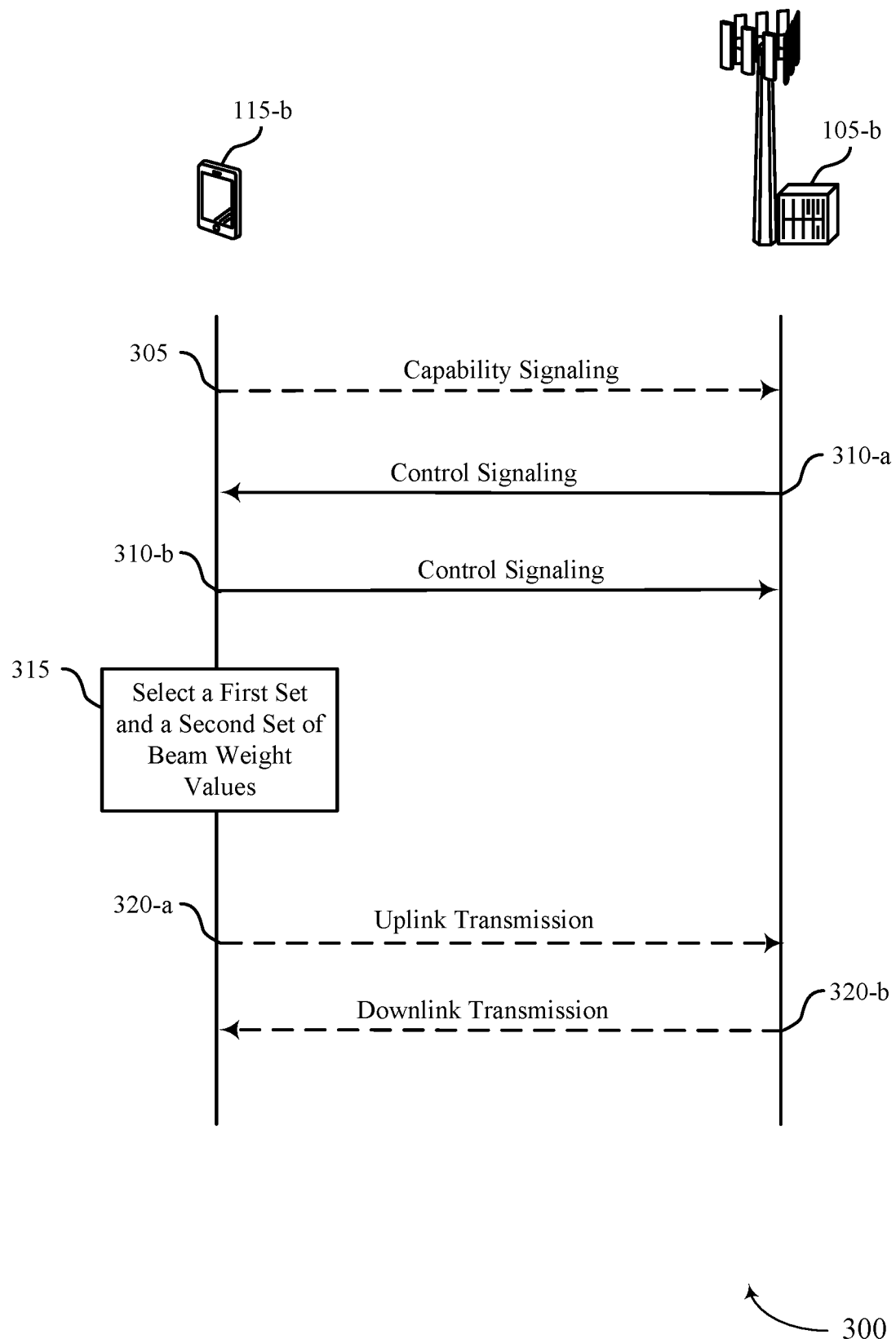
FIG. 3 illustrates an example of a process flow that supports techniques for beam correspondence with adaptive beam weights in accordance with one or more aspects of the present disclosure.

FIG. 3 illustrates an example of a process flow 300 that supports techniques for beam correspondence with adaptive beam weights in accordance with one or more aspects of the present disclosure. In some examples, the process flow 300 may implement or be implemented by aspects of a wireless communications system 100 and a wireless communications system 200. For example, the process flow 300 may be implemented by a network entity 105-*b* and a UE 115-*b* which may be examples of a base station 105 and a UE 115 as described with reference to FIGS. 1 and 2. Alternative examples of the following may be implemented, where some steps are performed in a different order then described or are not performed at all. In some cases, steps may include additional features not mentioned below, or further steps may be added.

At 305, in some examples, the UE 115-*b* may transmit capability information to the network entity 105-*b*. The capability information may indicate that the UE 115-*b* supports non-codebook-based beam weights different from static or a codebook-based beam weights, and the capability information may indicate that the UE 115-*b* is capable of dynamically switching (e.g., in a time-varying manner) between two beam correspondence modes. In some cases, the UE 115-*b* may transmit an indication in the capability information of a plurality of supported beam weights including the first set of beam weight values and the second set of beam weight values.

At 310-*a*, in some examples, the network entity 105-*a* may communicate control signaling to the UE 115-*b* including the time-varying beam correspondence mode indicator. The network entity 105-*b* may transmit the time-varying beam correspondence mode to the UE 115-*b*. The time-varying beam correspondence indicator may indicate that the UE 115-*b* is instructed to implement beam correspondence in signaling or that the UE 115-*b* is permitted to refrain from implementing beam correspondence. In some examples, the time-varying beam correspondence mode indicator may include an indication that beam correspondence is absent. In some examples, the time-varying beam correspondence mode indicator may include an indication that beam correspondence is present.

In some examples, the time varying beam-correspondence indicator may be based on a traffic pattern, a traffic load, mobility information, or a performance requirement. In some examples, the control signaling may include an indication of a number of bits associated with respective quantization levels. In some examples, the control signaling may include an indication of a performance threshold. The performance threshold may be associated with a channel environment, a difference between uplink power and downlink power, or a difference between uplink performance and downlink performance.

At 310-*b*, in some examples, the UE 115-*b* may communicate control signaling to the network entity 105-*b* including the time-varying beam correspondence mode indicator. In some examples, the control signaling may include an indication of a number of bits associated with the respective quantization levels. The UE 115-*b* may transmit the time-varying beam correspondence mode to the network entity 105-*b*. The time-varying beam correspondence mode indicator may be based on the UE 115-*b* transmitting the capability information. In some examples, the time-varying beam correspondence mode indicator may include an indication that beam correspondence is absent. In some examples, the time-varying beam correspondence mode indicator may include an indication that beam correspondence is present. In some examples, the time varying beam-correspondence indicator may be based on a traffic pattern, a traffic load, mobility information, or a performance requirement.

At 315, the UE 115-*b* may select a first set of beam weight values for an uplink beam and a second set of beam weight values for a downlink beam based on the time-varying beam correspondence indicator. The first set of beam weight values, the second set of beam weight values, or both, may be associated with phase control, amplitude control, or both. The phase control, the amplitude control, or a combination of both may be associated with respective quantization levels available in the hardware at the UE 115-*b*. The UE 115-*b* may select one or more beam weights associated with phase control, and the UE 115-*b* may set the amplitude control to an on configuration or an off configuration. The UE 115-*b* setting the amplitude control to an on configuration or an off configuration may be based on one or more conditions satisfying the performance threshold.

In some examples, the first set of beam weight values may be different from and may not be derived from the second set of beam weight values. In some examples, the first set of beam weight values may be derived from the second set of beam weight values. In some examples, selecting the first set of beam weight values for the uplink beam may be based on an uplink beam training procedure. In some examples, the UE 115-*b* may select the first set of beam weight values based on a traffic pattern, a traffic load, mobility information, or performance requirements.

At 320-*a*, in some examples, the UE 115-*b* may perform wireless communications with the network entity 105-*b* using the uplink beam according to the first set of beam weight values. In some examples, the UE 115-*b* may perform the uplink beam training procedure based on the indication that beam correspondence is absent. In some examples, the UE 115-*b* may transmit an uplink transmission to the UE 115-*b* using the first set of beam weight values.

At 320-*b*, in some examples, the UE 115-*b* may perform wireless communications with the network entity 105-*b* using the downlink beam according to the second set of beam weight values. In some examples, the network entity 105-*b* may transmit a downlink transmission to the UE 115-*b*, and the UE 115-*b* may receive the uplink transmission with the downlink beam using with the second set of beam weight values.

Figure 4:
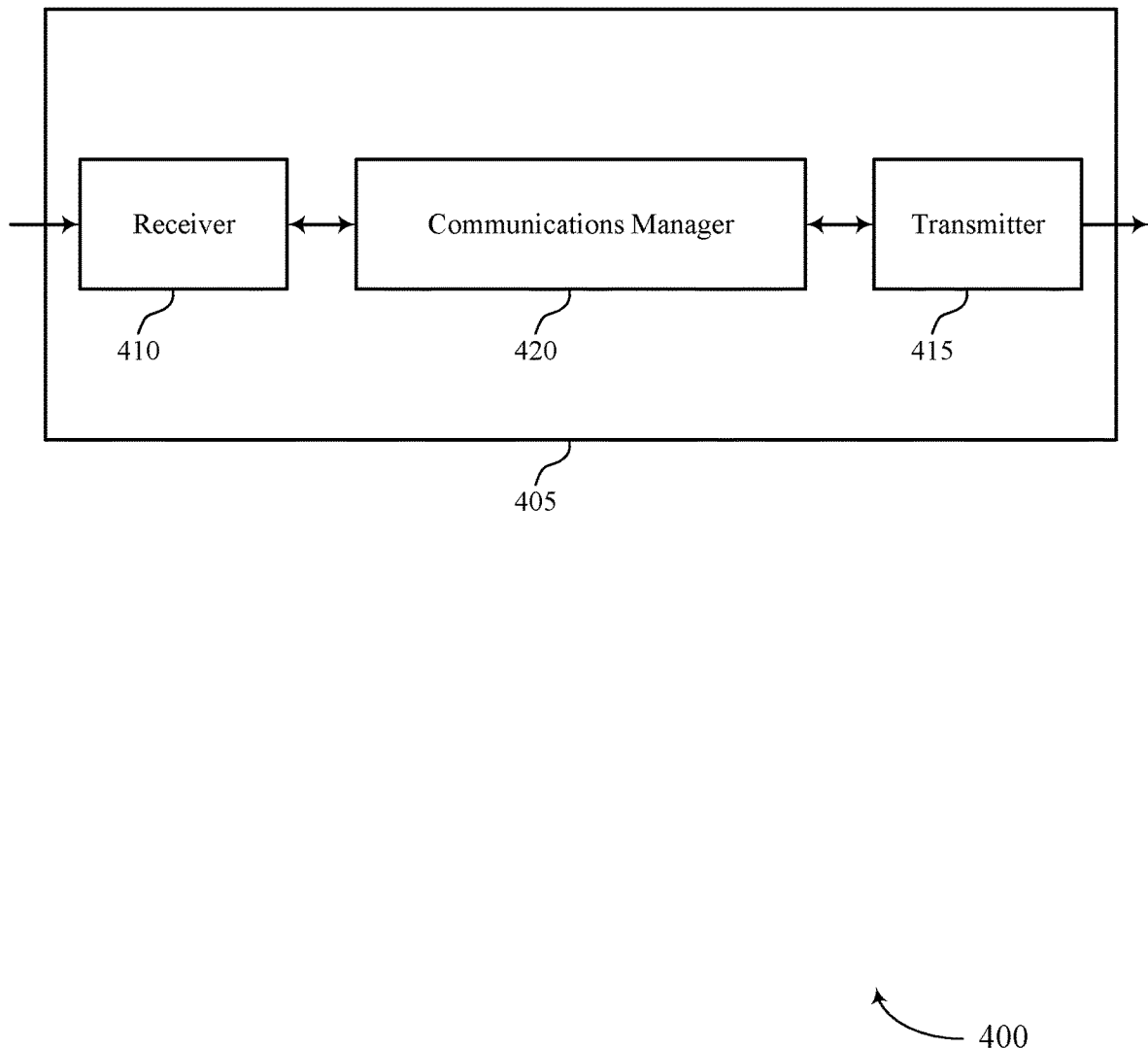
FIGS. 4 and 5 show block diagrams of devices that support techniques for beam correspondence with adaptive beam weights in accordance with one or more aspects of the present disclosure.

FIG. 4 shows a block diagram 400 of a device 405 that supports techniques for beam correspondence with adaptive beam weights in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for beam correspondence with adaptive beam weights). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for beam correspondence with adaptive beam weights). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for beam correspondence with adaptive beam weights as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in hardware, software (e.g., executable by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in code executed by a processor, the functions of the communications manager 420, the receiver 410, the transmitter 415, or various combinations or components thereof may be performed by a general-purpose processor, a DSP, a CPU, a graphic processing unit (GPU), an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for communicating control signaling including a time-varying beam correspondence mode indicator. The communications manager 420 may be configured as or otherwise support a means for selecting, based on the time-varying beam correspondence mode indicator, a first set of beam weight values for an uplink beam and a second set of beam weight values for a downlink beam. The communications manager 420 may be configured as or otherwise support a means for performing wireless communications with a network entity using the uplink beam according to the first set of beam weight values, the downlink beam according to the second set of beam weight values, or both.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for dynamic beamforming resulting in reduced power consumption.

Figure 5:
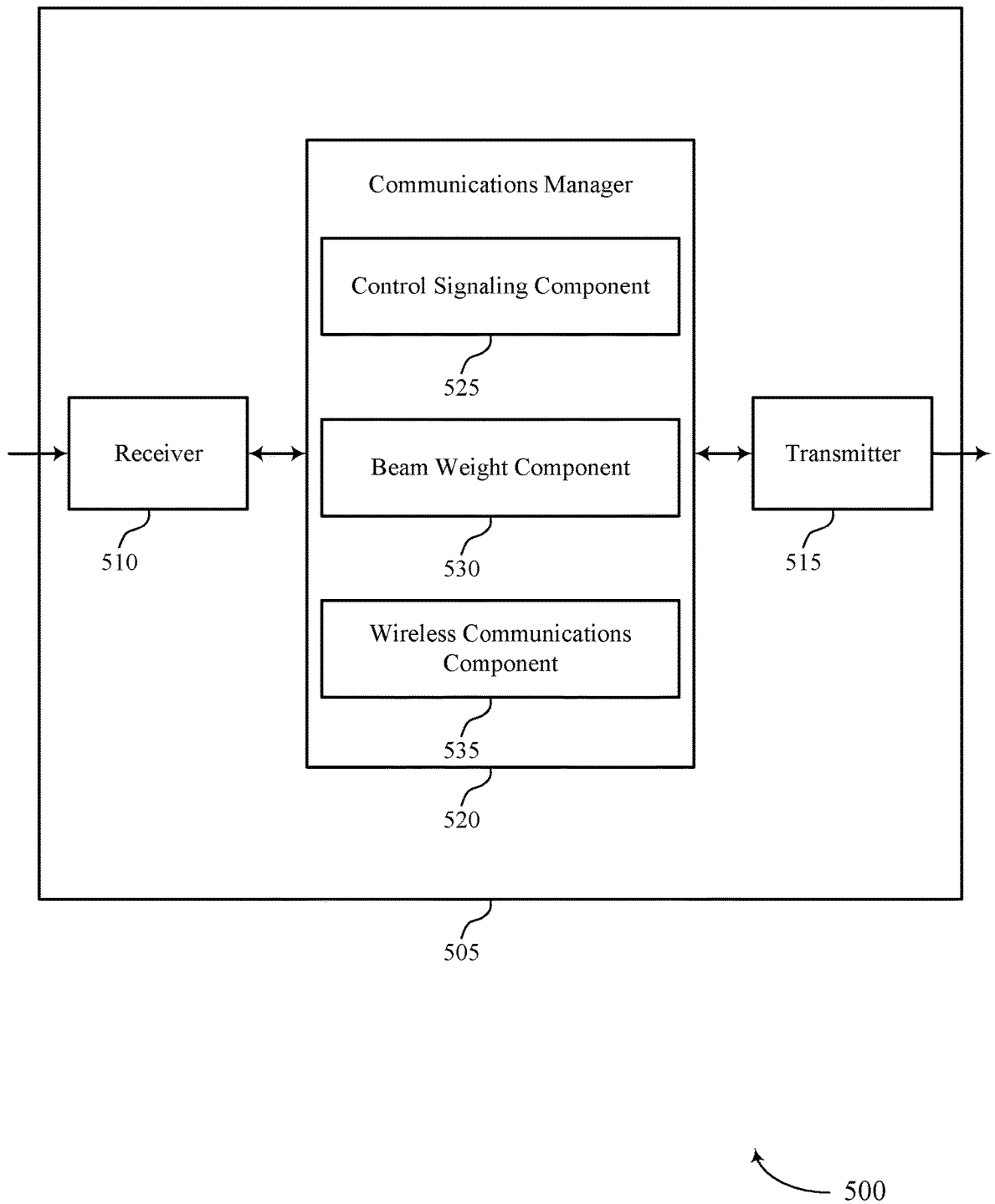

FIG. 5 shows a block diagram 500 of a device 505 that supports techniques for beam correspondence with adaptive beam weights in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam correspondence with adaptive beam weights). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam correspondence with adaptive beam weights). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for beam correspondence with adaptive beam weights as described herein. For example, the communications manager 520 may include a control signaling component 525, a beam weight component 530, a wireless communications component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The control signaling component 525 may be configured as or otherwise support a means for communicating control signaling including a time-varying beam correspondence mode indicator. The beam weight component 530 may be configured as or otherwise support a means for selecting, based on the time-varying beam correspondence mode indicator, a first set of beam weight values for an uplink beam and a second set of beam weight values for a downlink beam. The wireless communications component 535 may be configured as or otherwise support a means for performing wireless communications with a network entity using the uplink beam according to the first set of beam weight values, the downlink beam according to the second set of beam weight values, or both.

Figure 6:
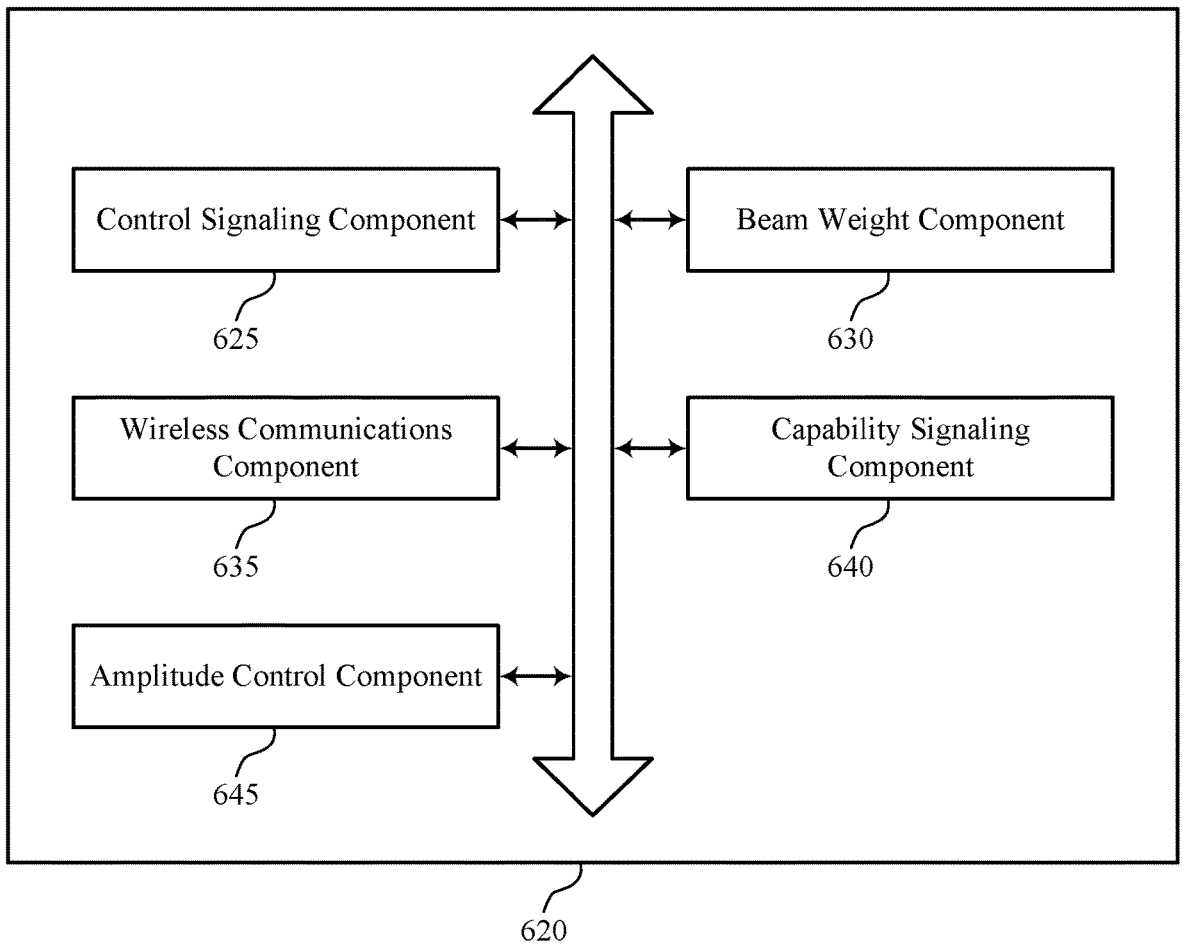
FIG. 6 shows a block diagram of a communications manager that supports techniques for beam correspondence with adaptive beam weights in accordance with one or more aspects of the present disclosure.

FIG. 6 shows a block diagram 600 of a communications manager 620 that supports techniques for beam correspondence with adaptive beam weights in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for beam correspondence with adaptive beam weights as described herein. For example, the communications manager 620 may include a control signaling component 625, a beam weight component 630, a wireless communications component 635, a capability signaling component 640, an amplitude control component 645, or any combination thereof. Each of these components may communicate, directly or indirectly, with one another (e.g., via one or more buses).

The communications manager 620 may support wireless communications at a UE in accordance with examples as disclosed herein. The control signaling component 625 may be configured as or otherwise support a means for communicating control signaling including a time-varying beam correspondence mode indicator. The beam weight component 630 may be configured as or otherwise support a means for selecting, based on the time-varying beam correspondence mode indicator, a first set of beam weight values for an uplink beam and a second set of beam weight values for a downlink beam. The wireless communications component 635 may be configured as or otherwise support a means for performing wireless communications with a network entity using the uplink beam according to the first set of beam weight values, the downlink beam according to the second set of beam weight values, or both.

In some examples, to support communicating the control signaling, the control signaling component 625 may be configured as or otherwise support a means for receiving the time-varying beam correspondence mode indicator from the network entity indicating that the UE is instructed to implement beam correspondence in signaling or is permitted to refrain from implementing beam correspondence.

In some examples, the capability signaling component 640 may be configured as or otherwise support a means for transmitting capability information indicating that the UE supports non-codebook-based beam weights different from codebook-based beam weights, and is capable of dynamically switching between two beam correspondence modes, where receiving the time-varying beam correspondence mode indicator is based on transmitting the capability information.

In some examples, the capability signaling component 640 may be configured as or otherwise support a means for transmitting, in the capability information, an indication of a set of multiple supported beam weights including the first set of beam weight values and the second set of beam weight values.

In some examples, the first set of beam weight values, the second set of beam weight values, or both, are associated with phase control, amplitude control, or both. In some examples, the phase control, amplitude control, or both, are associated with respective quantization levels available in the hardware at the UE.

In some examples, the control signaling component 625 may be configured as or otherwise support a means for receiving an indication of a number of bits associated with the respective quantization levels.

In some examples, the control signaling component 625 may be configured as or otherwise support a means for transmitting an indication of a number of bits associated with the respective quantization levels.

In some examples, to support communicating the control signaling, the control signaling component 625 may be configured as or otherwise support a means for transmitting the time-varying beam correspondence mode indicator to a network entity.

In some examples, to support communicating the time-varying beam correspondence mode indicator, the control signaling component 625 may be configured as or otherwise support a means for transmitting the time-varying beam correspondence mode indicator based on a traffic pattern, a traffic load, mobility information, a performance requirement, or any combination thereof.

In some examples, the time-varying beam correspondence mode indicator includes an indication that beam correspondence is absent. In some examples, the first set of beam weight values is different from and cannot be derived from the second set of beam weight values.

In some examples, the beam weight component 630 may be configured as or otherwise support a means for performing an uplink beam training procedure based on the indication that beam correspondence is absent, where selecting the first set of beam weight values for the uplink beam is based on the uplink beam training procedure.

In some examples, the beam weight component 630 may be configured as or otherwise support a means for selecting the first set of beam weight values is based on a traffic pattern, a traffic load, mobility information, performance requirements, or any combination thereof.

In some examples, the time-varying beam correspondence mode indicator includes an indication that beam correspondence is present. In some examples, the first set of beam weight values is derived from the second set of beam weight values.

In some examples, to support selecting the first set of beam weight values and the second set of beam weight values, the beam weight component 630 may be configured as or otherwise support a means for selecting one or more beam weights associated with phase control, and setting amplitude control to an on configuration or an off configuration.

In some examples, the amplitude control component 645 may be configured as or otherwise support a means for setting the amplitude control to the on configuration or the off configuration is based on one or more conditions satisfying a performance threshold.

In some examples, the control signaling component 625 may be configured as or otherwise support a means for receiving an indication of the performance threshold from the network entity.

In some examples, the performance threshold is associated with a channel environment, a difference between uplink power and downlink power, a difference between uplink performance and downlink performance, or any combination thereof.

Figure 7:
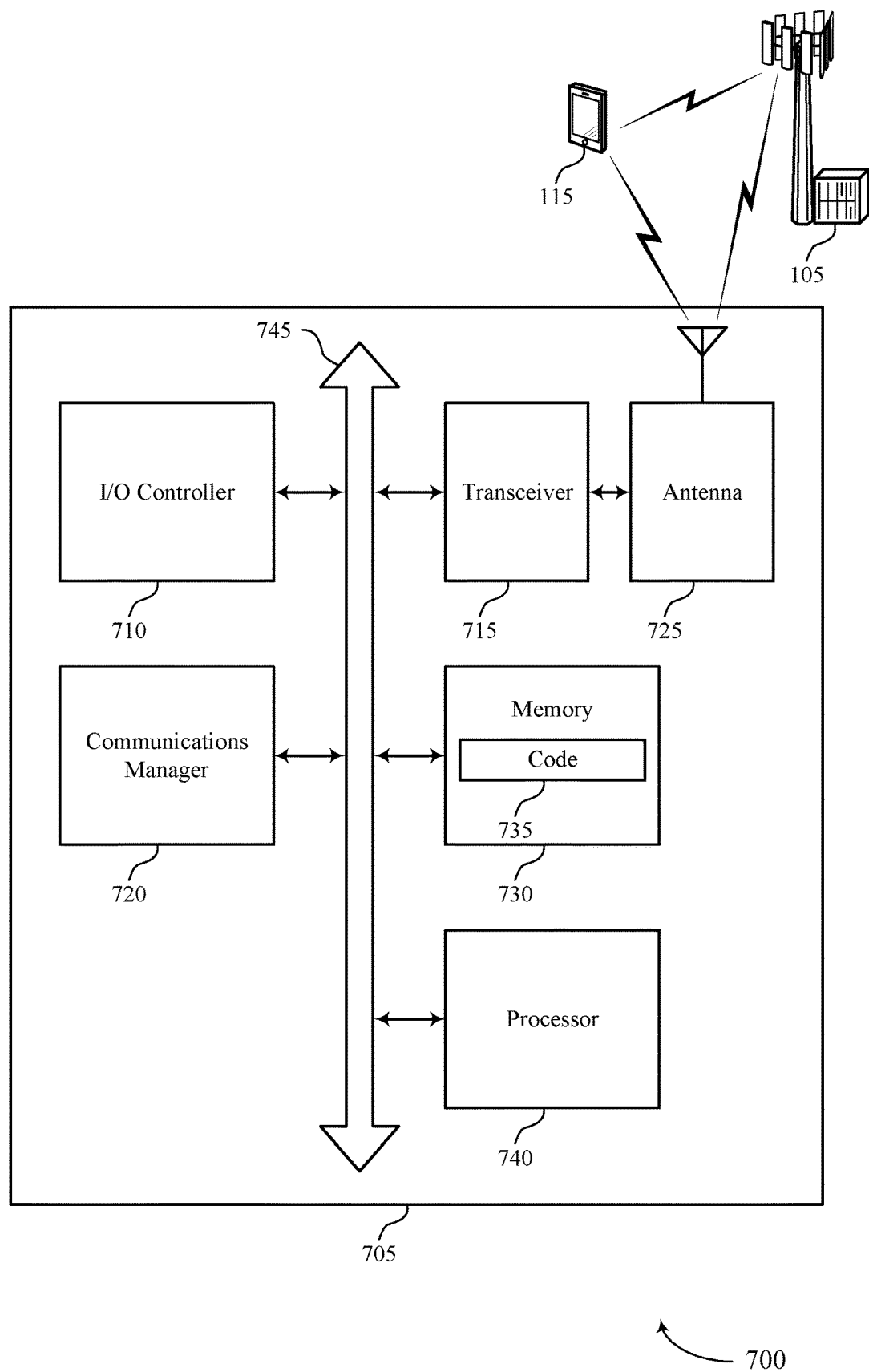
FIG. 7 shows a diagram of a system including a device that supports techniques for beam correspondence with adaptive beam weights in accordance with one or more aspects of the present disclosure.

FIG. 7 shows a diagram of a system 700 including a device 705 that supports techniques for beam correspondence with adaptive beam weights in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a GPU, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for beam correspondence with adaptive beam weights). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for communicating control signaling including a time-varying beam correspondence mode indicator. The communications manager 720 may be configured as or otherwise support a means for selecting, based on the time-varying beam correspondence mode indicator, a first set of beam weight values for an uplink beam and a second set of beam weight values for a downlink beam. The communications manager 720 may be configured as or otherwise support a means for performing wireless communications with a network entity using the uplink beam according to the first set of beam weight values, the downlink beam according to the second set of beam weight values, or both.

By including or configuring the communications manager 720 in accordance with examples as described herein, the device 705 may support techniques for dynamic beamforming resulting in improved communication reliability, reduced latency, reduced power consumption, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for beam correspondence with adaptive beam weights as described herein, or the processor 740 and the memory 730 may be otherwise configured to perform or support such operations.

Figure 8:
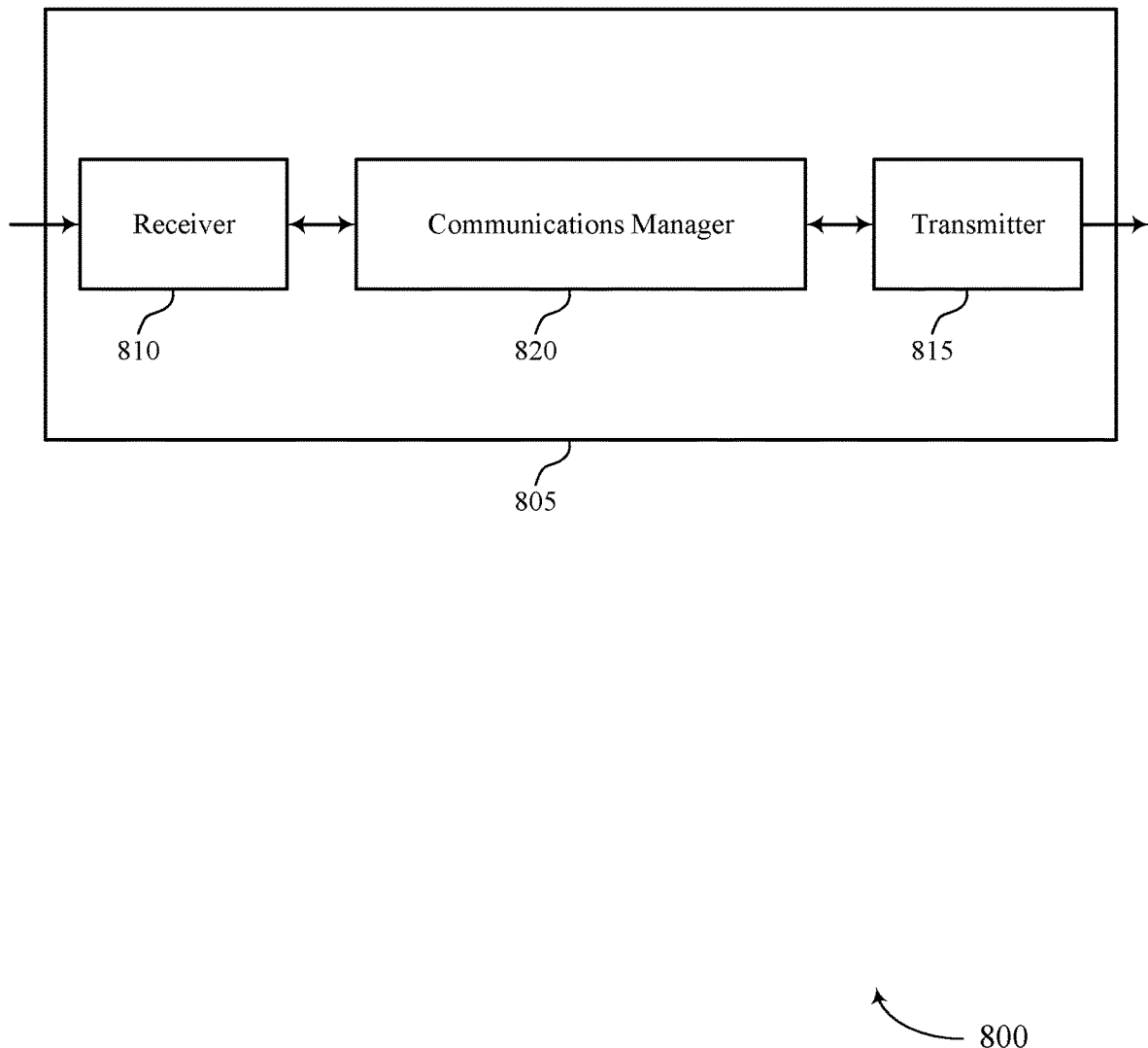
FIGS. 8 and 9 show block diagrams of devices that support techniques for beam correspondence with adaptive beam weights in accordance with one or more aspects of the present disclosure.

FIG. 8 shows a block diagram 800 of a device 805 that supports techniques for beam correspondence with adaptive beam weights in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for beam correspondence with adaptive beam weights as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in hardware, software (e.g., executable by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for communicating control signaling including a time-varying beam correspondence mode indicator. The communications manager 820 may be configured as or otherwise support a means for selecting, based on the time-varying beam correspondence mode indicator, a beam correspondence mode. The communications manager 820 may be configured as or otherwise support a means for performing wireless communications with a UE using an uplink beam and a downlink beam according to the beam correspondence mode.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for dynamic beamforming resulting in reduced power consumption.

Figure 9:
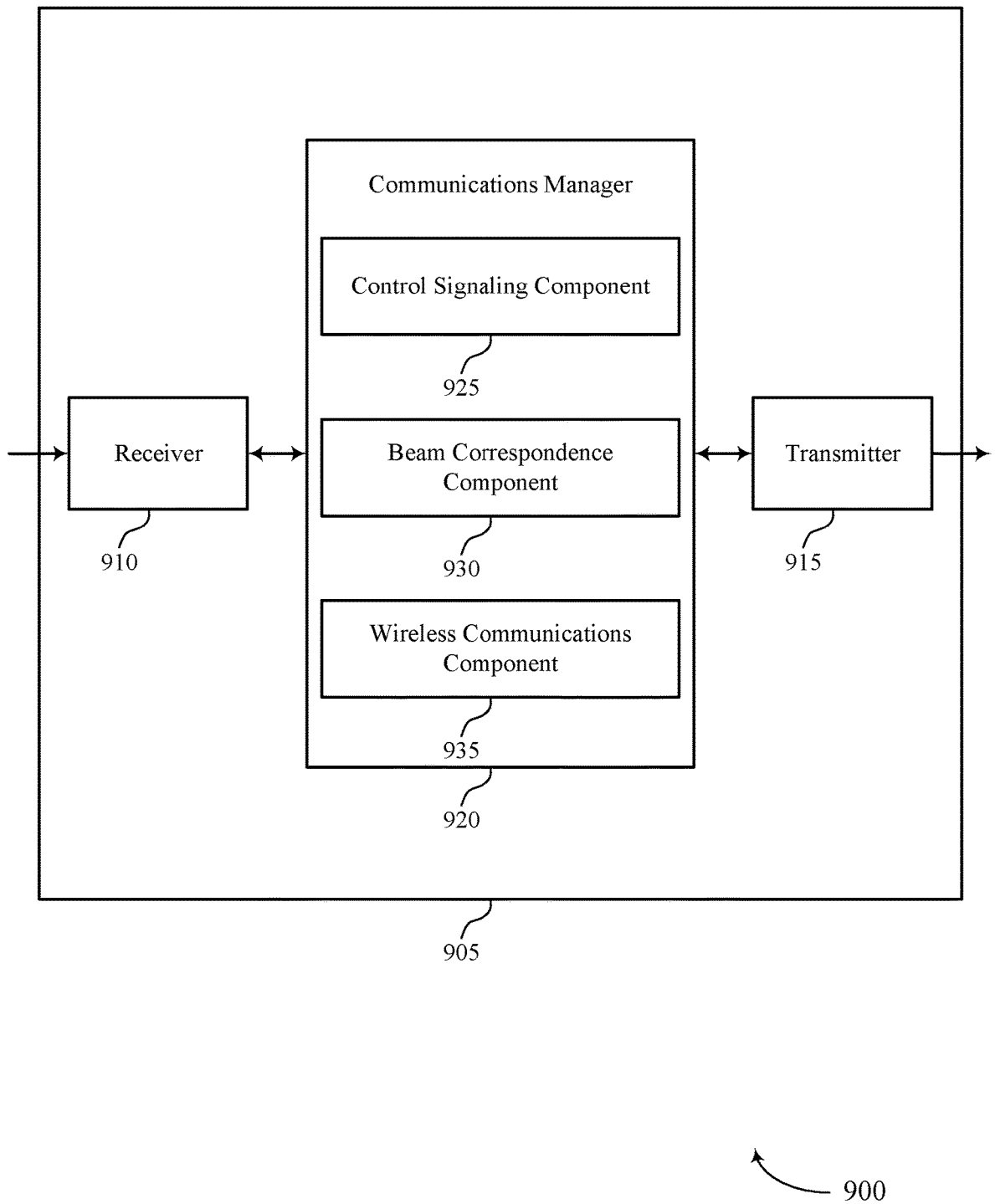

FIG. 9 shows a block diagram 900 of a device 905 that supports techniques for beam correspondence with adaptive beam weights in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for beam correspondence with adaptive beam weights as described herein. For example, the communications manager 920 may include a control signaling component 925, a beam correspondence component 930, a wireless communications component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The control signaling component 925 may be configured as or otherwise support a means for communicating control signaling including a time-varying beam correspondence mode indicator. The beam correspondence component 930 may be configured as or otherwise support a means for selecting, based on the time-varying beam correspondence mode indicator, a beam correspondence mode. The wireless communications component 935 may be configured as or otherwise support a means for performing wireless communications with a UE using an uplink beam and a downlink beam according to the beam correspondence mode.

Figure 10:
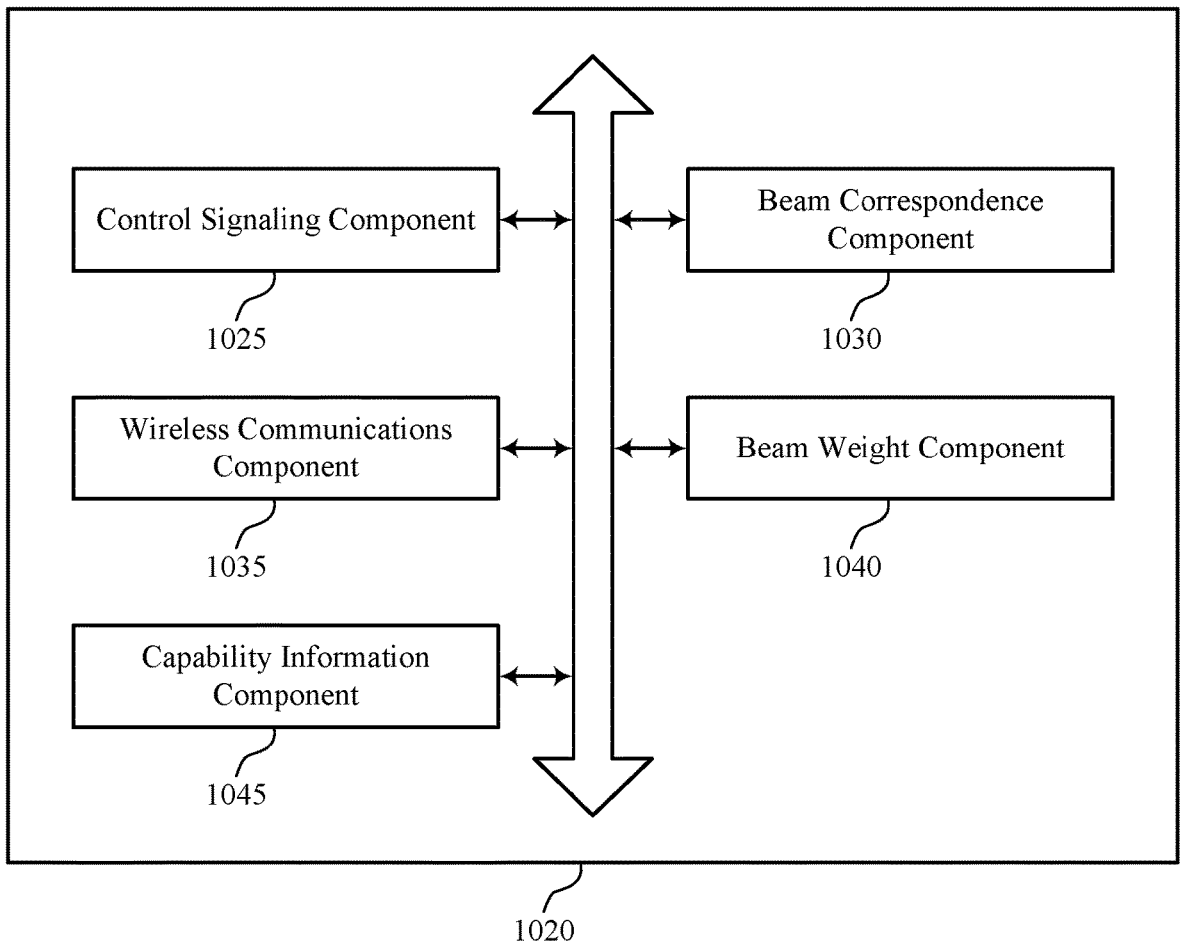
FIG. 10 shows a block diagram of a communications manager that supports techniques for beam correspondence with adaptive beam weights in accordance with one or more aspects of the present disclosure.

FIG. 10 shows a block diagram 1000 of a communications manager 1020 that supports techniques for beam correspondence with adaptive beam weights in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for beam correspondence with adaptive beam weights as described herein. For example, the communications manager 1020 may include a control signaling component 1025, a beam correspondence component 1030, a wireless communications component 1035, a beam weight component 1040, a capability information component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The control signaling component 1025 may be configured as or otherwise support a means for communicating control signaling including a time-varying beam correspondence mode indicator. The beam correspondence component 1030 may be configured as or otherwise support a means for selecting, based on the time-varying beam correspondence mode indicator, a beam correspondence mode. The wireless communications component 1035 may be configured as or otherwise support a means for performing wireless communications with a UE using an uplink beam and a downlink beam according to the beam correspondence mode.

In some examples, to support communicating the control signaling, the beam correspondence component 1030 may be configured as or otherwise support a means for transmitting the time-varying beam correspondence mode indicator to the UE, the time-varying beam correspondence mode indicator indicating that the UE is instructed to implement beam correspondence in signaling or is permitted to refrain from implementing beam correspondence.

In some examples, the capability information component 1045 may be configured as or otherwise support a means for receiving capability information indicating that the UE supports non-codebook-based beam weights different from codebook-based beam weights, and is capable of dynamically switching between two beam correspondence modes, where transmitting the time-varying beam correspondence mode indicator is based on transmitting the capability information.

In some examples, the capability information component 1045 may be configured as or otherwise support a means for receiving, in the capability information, an indication of a set of multiple supported beam weights including a first set of beam weight values associated with an uplink beam and a second set of beam weight values associated with a downlink beam.

In some examples, the uplink beam is associated with a first set of beam weight values and the downlink beam is associated with a second set of beam weight values. In some examples, the first set of beam weight values, the second set of beam weight values, or both, are associated with phase control, amplitude control, or both. In some examples, the phase control, amplitude control, or both, are associated with respective quantization levels available in the hardware at the UE.

In some examples, the control signaling component 1025 may be configured as or otherwise support a means for transmitting an indication of a number of bits associated with the respective quantization levels.

In some examples, the control signaling component 1025 may be configured as or otherwise support a means for receiving an indication of a number of bits associated with the respective quantization levels.

In some examples, to support communicating the time-varying beam correspondence mode indicator, the control signaling component 1025 may be configured as or otherwise support a means for receiving the time-varying beam correspondence mode indicator based on a traffic pattern, a traffic load, mobility information, performance requirements, or any combination thereof.

In some examples, the time-varying beam correspondence mode indicator includes an indication that beam correspondence is absent. In some examples, the uplink beam is associated with a first set of beam weight values different from and that cannot be derived from a second set of beam weight values associated with the downlink beam.

In some examples, the time-varying beam correspondence mode indicator includes an indication that correspondence is present. In some examples, the uplink beam is associated with a first set of beam weight values and the downlink beam is associated with a second set of beam weight values, where the first set of beam weight values is derived from the second set of beam weight values.

Figure 11:
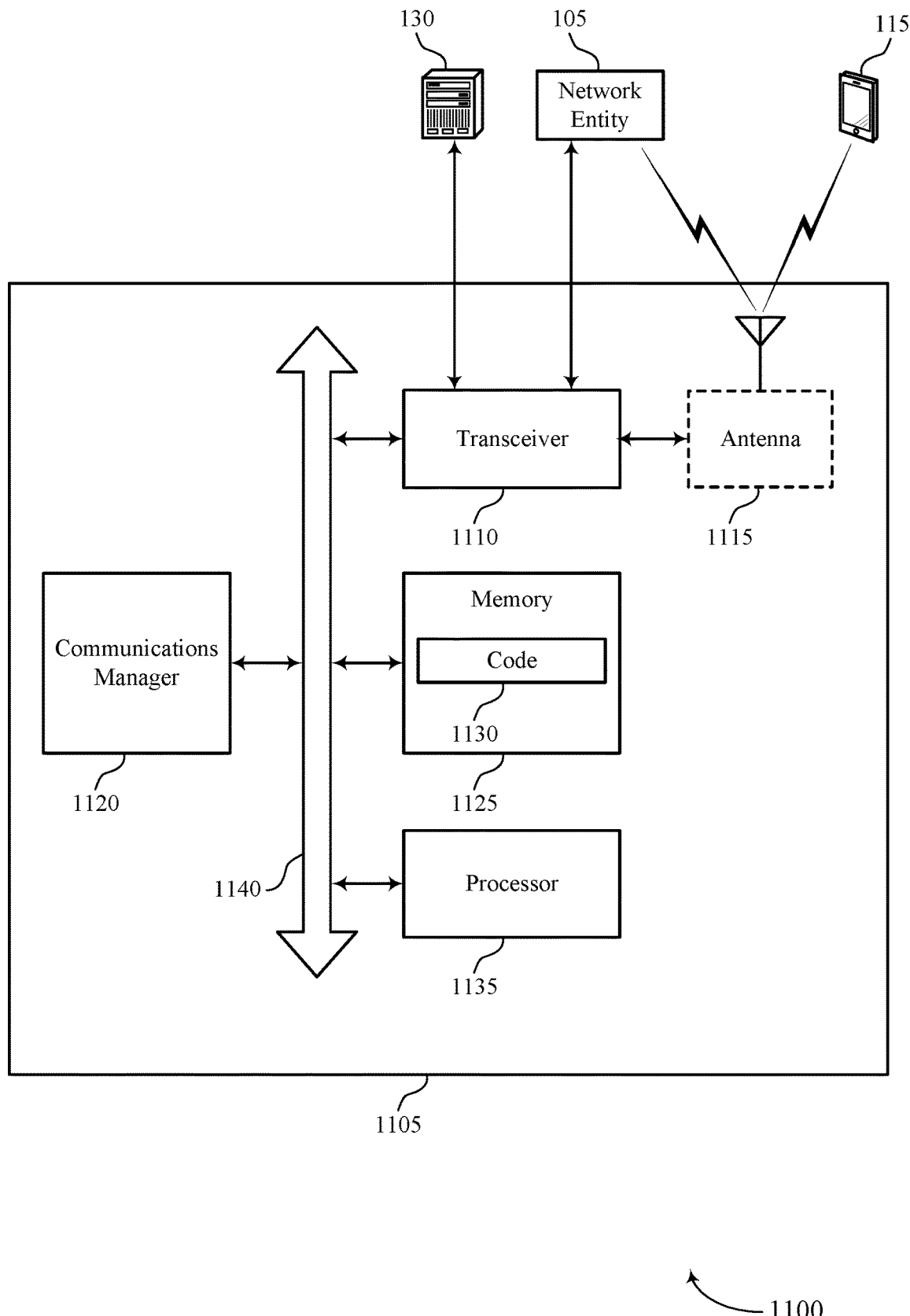
FIG. 11 shows a diagram of a system including a device that supports techniques for beam correspondence with adaptive beam weights in accordance with one or more aspects of the present disclosure.

FIG. 11 shows a diagram of a system 1100 including a device 1105 that supports techniques for beam correspondence with adaptive beam weights in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for beam correspondence with adaptive beam weights). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for communicating control signaling including a time-varying beam correspondence mode indicator. The communications manager 1120 may be configured as or otherwise support a means for selecting, based on the time-varying beam correspondence mode indicator, a beam correspondence mode. The communications manager 1120 may be configured as or otherwise support a means for performing wireless communications with a UE using an uplink beam and a downlink beam according to the beam correspondence mode.

By including or configuring the communications manager 1120 in accordance with examples as described herein, the device 1105 may support techniques for dynamic beamforming resulting in improved communication reliability, reduced latency, reduced power consumption, and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for beam correspondence with adaptive beam weights as described herein, or the processor 1135 and the memory 1125 may be otherwise configured to perform or support such operations.

Figure 12:
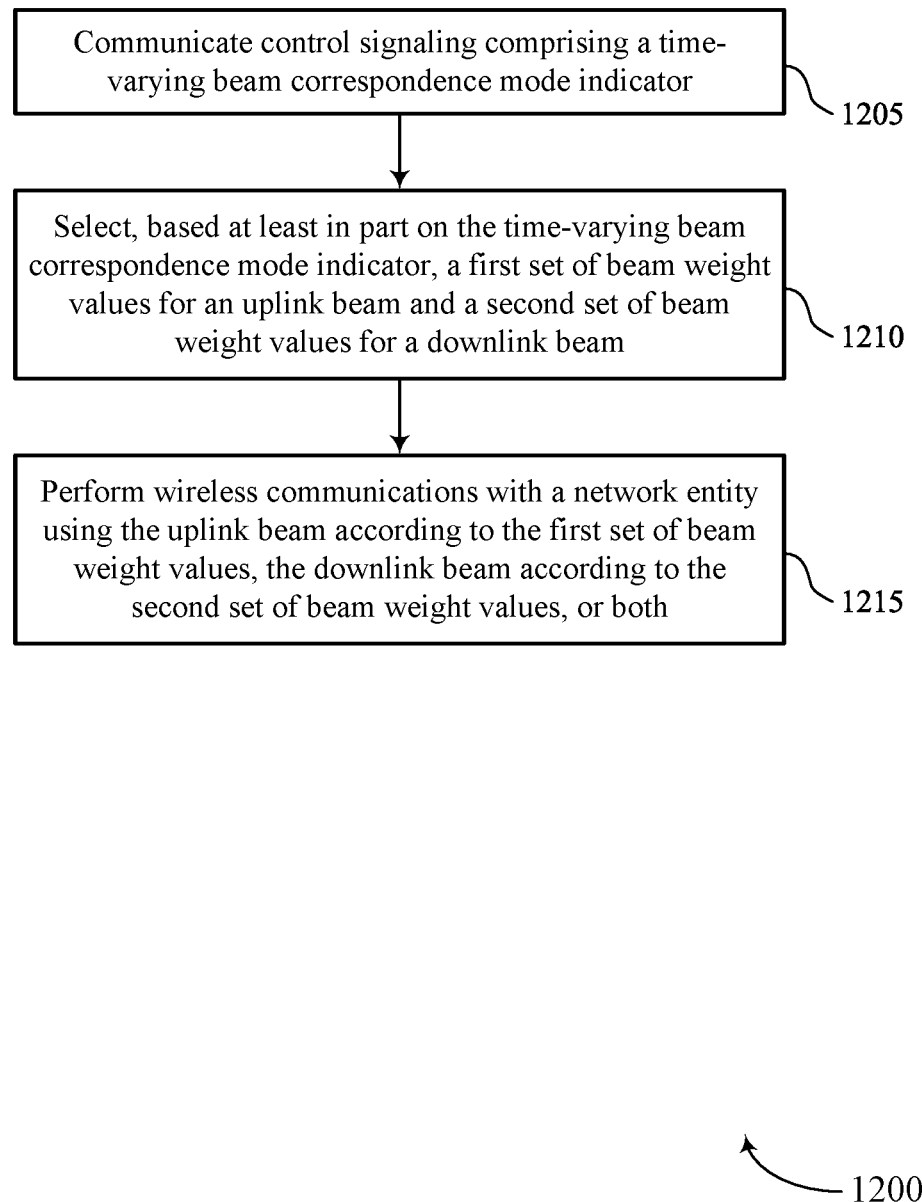
FIGS. 12 through 16 show flowcharts illustrating methods that support techniques for beam correspondence with adaptive beam weights in accordance with one or more aspects of the present disclosure.

FIG. 12 shows a flowchart illustrating a method 1200 that supports techniques for beam correspondence with adaptive beam weights in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include communicating control signaling including a time-varying beam correspondence mode indicator. The operations of 1205 may be performed in accordance with examples as disclosed herein. In some examples, aspects of the operations of 1205 may be performed by a control signaling component 625 as described with reference to FIG. 6.

At 1210, the method may include selecting, based on the time-varying beam correspondence mode indicator, a first set of beam weight values for an uplink beam and a second set of beam weight values for a downlink beam. The operations of 1210 may be performed in accordance with examples as disclosed herein. In some examples, aspects of the operations of 1210 may be performed by a beam weight component 630 as described with reference to FIG. 6.

At 1215, the method may include performing wireless communications with a network entity using the uplink beam according to the first set of beam weight values, the downlink beam according to the second set of beam weight values, or both. The operations of 1215 may be performed in accordance with examples as disclosed herein. In some examples, aspects of the operations of 1215 may be performed by a wireless communications component 635 as described with reference to FIG. 6.

Figure 13:
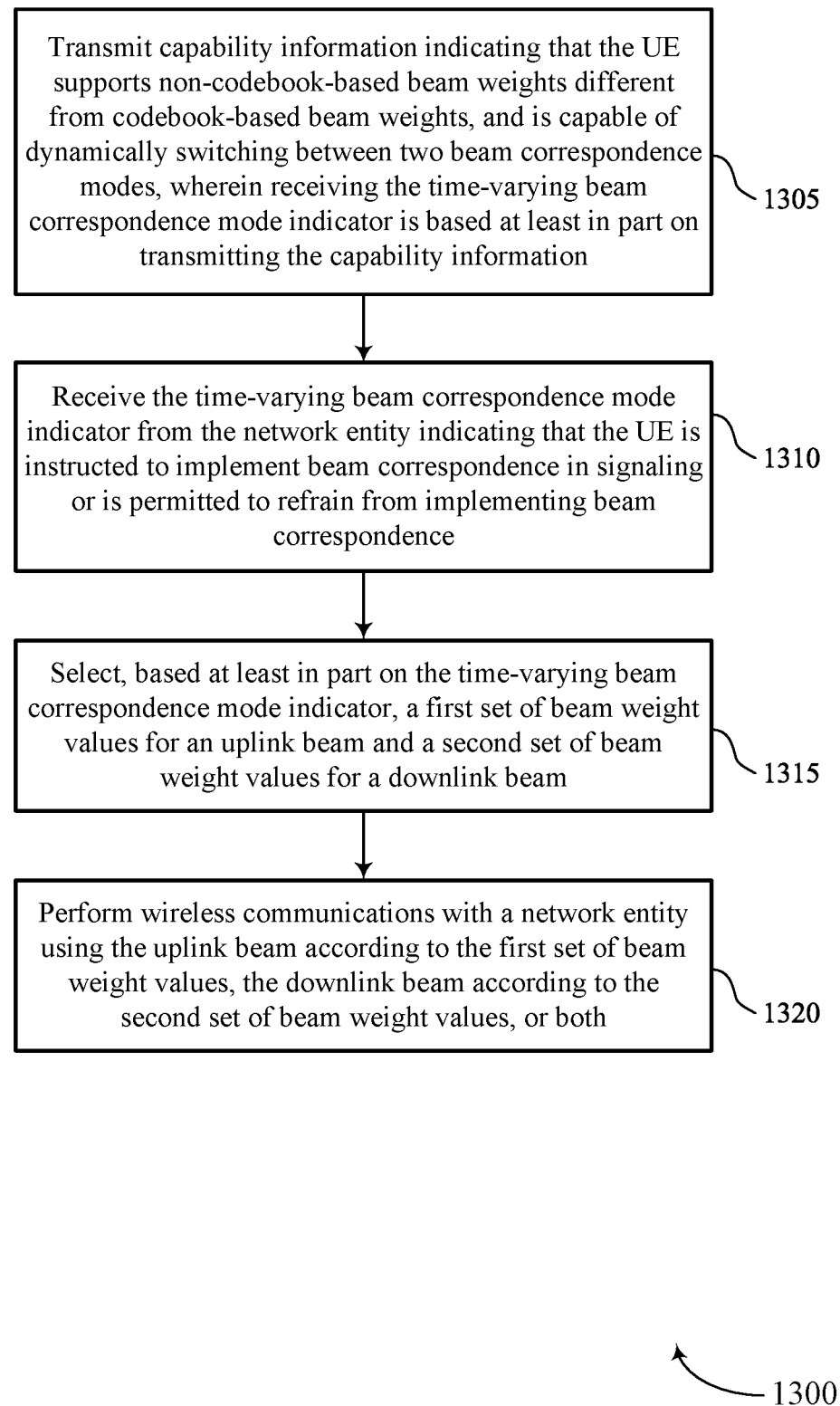

FIG. 13 shows a flowchart illustrating a method 1300 that supports techniques for beam correspondence with adaptive beam weights in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting capability information indicating that the UE supports non-codebook-based beam weights different from codebook-based beam weights, and is capable of dynamically switching between two beam correspondence modes, where receiving the time-varying beam correspondence mode indicator is based on transmitting the capability information. The operations of 1305 may be performed in accordance with examples as disclosed herein. In some examples, aspects of the operations of 1305 may be performed by a capability signaling component 640 as described with reference to FIG. 6.

At 1310, the method may include receiving the time-varying beam correspondence mode indicator from the network entity indicating that the UE is instructed to implement beam correspondence in signaling or is permitted to refrain from implementing beam correspondence. The operations of 1310 may be performed in accordance with examples as disclosed herein. In some examples, aspects of the operations of 1310 may be performed by a control signaling component 625 as described with reference to FIG. 6.

At 1315, the method may include selecting, based on the time-varying beam correspondence mode indicator, a first set of beam weight values for an uplink beam and a second set of beam weight values for a downlink beam. The operations of 1315 may be performed in accordance with examples as disclosed herein. In some examples, aspects of the operations of 1315 may be performed by a beam weight component 630 as described with reference to FIG. 6.

At 1320, the method may include performing wireless communications with a network entity using the uplink beam according to the first set of beam weight values, the downlink beam according to the second set of beam weight values, or both. The operations of 1320 may be performed in accordance with examples as disclosed herein. In some examples, aspects of the operations of 1320 may be performed by a wireless communications component 635 as described with reference to FIG. 6.

Figure 14:
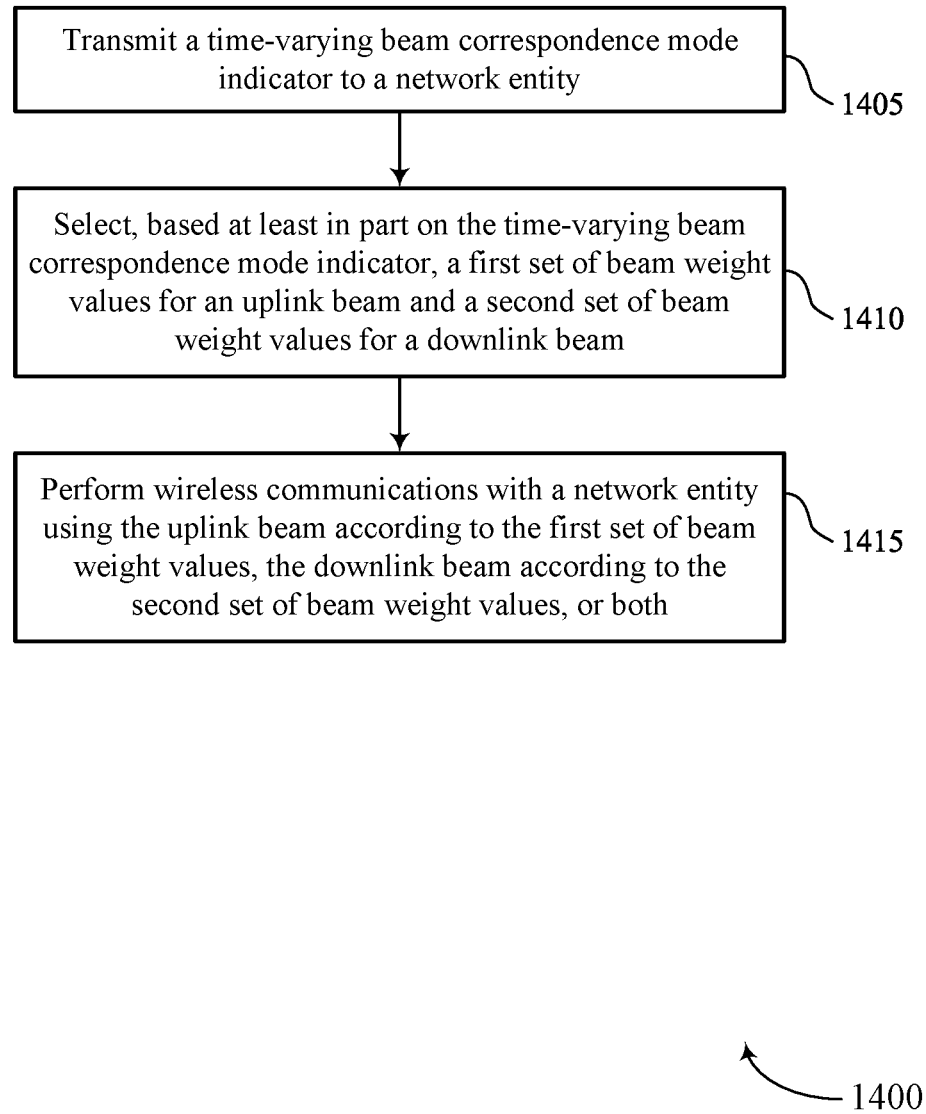

FIG. 14 shows a flowchart illustrating a method 1400 that supports techniques for beam correspondence with adaptive beam weights in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include transmitting the time-varying beam correspondence mode indicator to a network entity. The operations of 1405 may be performed in accordance with examples as disclosed herein. In some examples, aspects of the operations of 1405 may be performed by a control signaling component 625 as described with reference to FIG. 6.

At 1410, the method may include selecting, based on the time-varying beam correspondence mode indicator, a first set of beam weight values for an uplink beam and a second set of beam weight values for a downlink beam. The operations of 1410 may be performed in accordance with examples as disclosed herein. In some examples, aspects of the operations of 1410 may be performed by a beam weight component 630 as described with reference to FIG. 6.

At 1415, the method may include performing wireless communications with a network entity using the uplink beam according to the first set of beam weight values, the downlink beam according to the second set of beam weight values, or both. The operations of 1415 may be performed in accordance with examples as disclosed herein. In some examples, aspects of the operations of 1415 may be performed by a wireless communications component 635 as described with reference to FIG. 6.

Figure 15:
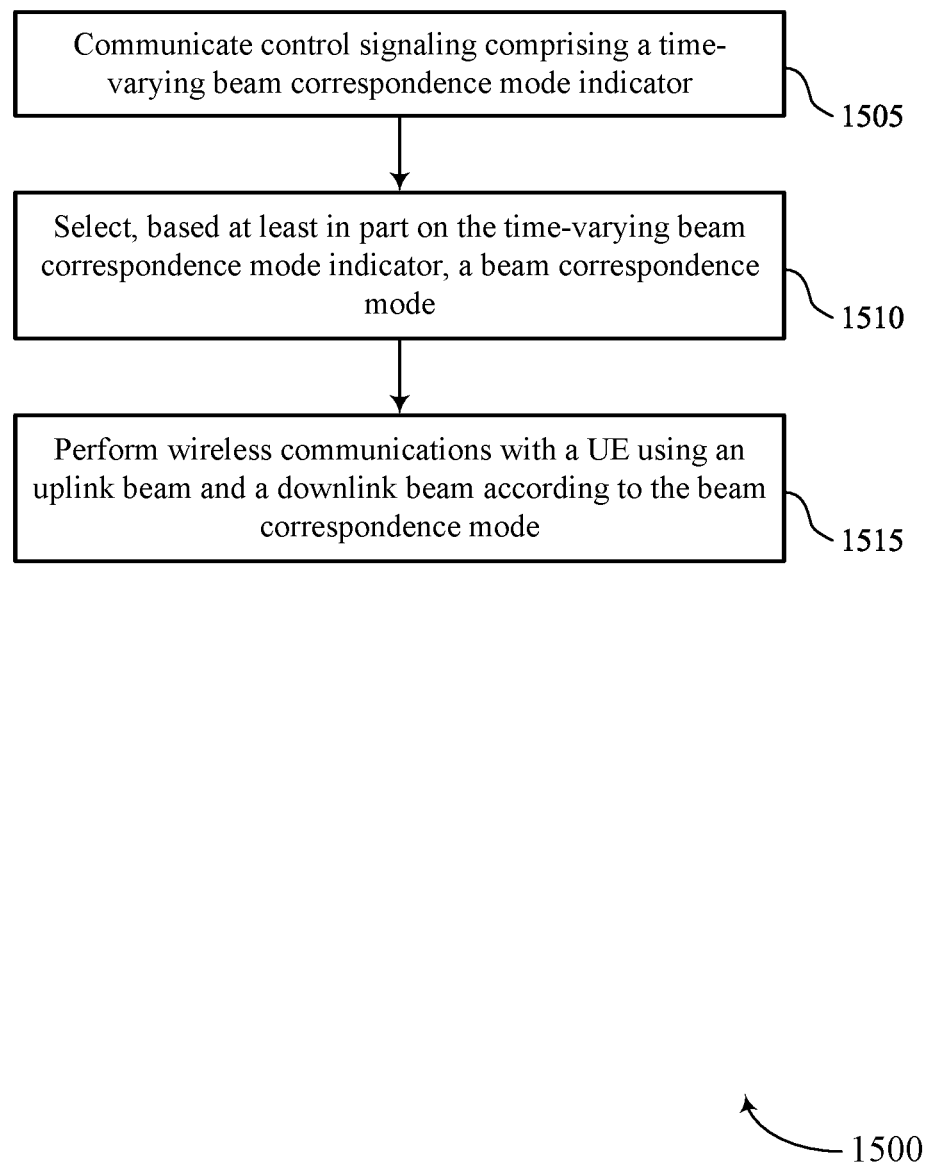

FIG. 15 shows a flowchart illustrating a method 1500 that supports techniques for beam correspondence with adaptive beam weights in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include communicating control signaling including a time-varying beam correspondence mode indicator. The operations of 1505 may be performed in accordance with examples as disclosed herein. In some examples, aspects of the operations of 1505 may be performed by a control signaling component 1025 as described with reference to FIG. 10.

At 1510, the method may include selecting, based on the time-varying beam correspondence mode indicator, a beam correspondence mode. The operations of 1510 may be performed in accordance with examples as disclosed herein. In some examples, aspects of the operations of 1510 may be performed by a beam correspondence component 1030 as described with reference to FIG. 10.

At 1515, the method may include performing wireless communications with a UE using an uplink beam and a downlink beam according to the beam correspondence mode. The operations of 1515 may be performed in accordance with examples as disclosed herein. In some examples, aspects of the operations of 1515 may be performed by a wireless communications component 1035 as described with reference to FIG. 10.

Figure 16:
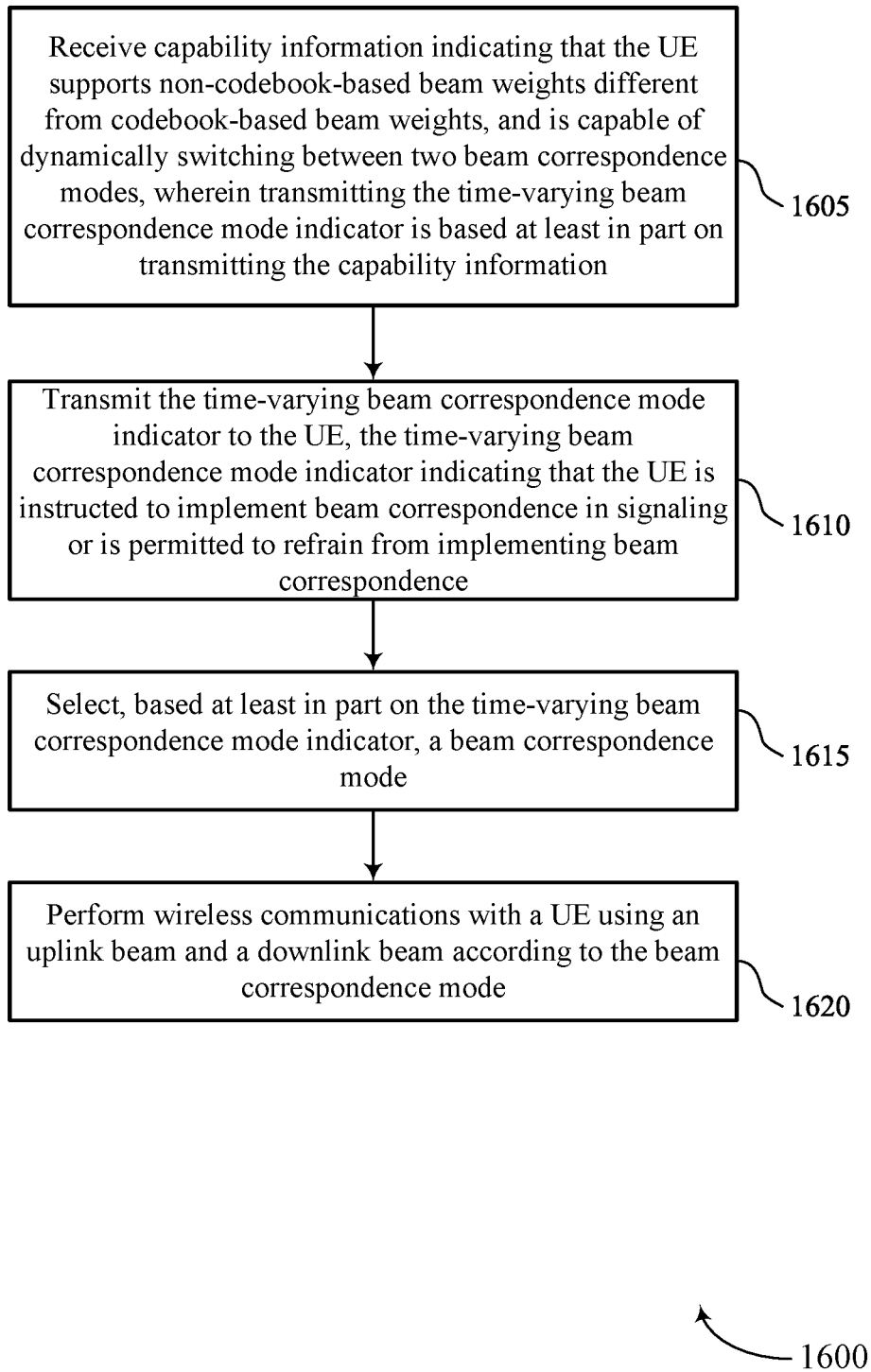

FIG. 16 shows a flowchart illustrating a method 1600 that supports techniques for beam correspondence with adaptive beam weights in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include receiving capability information indicating that the UE supports non-codebook-based beam weights different from codebook-based beam weights, and is capable of dynamically switching between two beam correspondence modes, where transmitting the time-varying beam correspondence mode indicator is based on transmitting the capability information. The operations of 1605 may be performed in accordance with examples as disclosed herein. In some examples, aspects of the operations of 1605 may be performed by a capability information component 1045 as described with reference to FIG. 10.

At 1610, the method may include transmitting the time-varying beam correspondence mode indicator to the UE, the time-varying beam correspondence mode indicator indicating that the UE is instructed to implement beam correspondence in signaling or is permitted to refrain from implementing beam correspondence. The operations of 1610 may be performed in accordance with examples as disclosed herein. In some examples, aspects of the operations of 1610 may be performed by a beam correspondence component 1030 as described with reference to FIG. 10.

At 1615, the method may include selecting, based on the time-varying beam correspondence mode indicator, a beam correspondence mode. The operations of 1615 may be performed in accordance with examples as disclosed herein. In some examples, aspects of the operations of 1615 may be performed by a beam correspondence component 1030 as described with reference to FIG. 10.

At 1620, the method may include performing wireless communications with a UE using an uplink beam and a downlink beam according to the beam correspondence mode. The operations of 1620 may be performed in accordance with examples as disclosed herein. In some examples, aspects of the operations of 1620 may be performed by a wireless communications component 1035 as described with reference to FIG. 10.

The following provides an overview of aspects of the present disclosure:

Aspect 1: A method for wireless communications at a UE, comprising: communicating control signaling comprising a time-varying beam correspondence mode indicator; selecting, based at least in part on the time-varying beam correspondence mode indicator, a first set of beam weight values for an uplink beam and a second set of beam weight values for a downlink beam; and performing wireless communications with a network entity using the uplink beam according to the first set of beam weight values, the downlink beam according to the second set of beam weight values, or both.

Aspect 2: The method of aspect 1, wherein communicating the control signaling comprises: receiving the time-varying beam correspondence mode indicator from the network entity indicating that the UE is instructed to implement beam correspondence in signaling or is permitted to refrain from implementing beam correspondence.

Aspect 3: The method of aspect 2, further comprising: transmitting capability information indicating that the UE supports non-codebook-based beam weights different from codebook-based beam weights, and is capable of dynamically switching between two beam correspondence modes, wherein receiving the time-varying beam correspondence mode indicator is based at least in part on transmitting the capability information.

Aspect 4: The method of aspect 3, further comprising: transmitting, in the capability information, an indication of a plurality of supported beam weights comprising the first set of beam weight values and the second set of beam weight values.

Aspect 5: The method of any of aspects 1 through 4, wherein the first set of beam weight values, the second set of beam weight values, or both, are associated with phase control, amplitude control, or both, and the phase control, amplitude control, or both, are associated with respective quantization levels available in the hardware at the UE.

Aspect 6: The method of aspect 5, further comprising: receiving an indication of a number of bits associated with the respective quantization levels.

Aspect 7: The method of any of aspects 5 through 6, further comprising: transmitting an indication of a number of bits associated with the respective quantization levels.

Aspect 8: The method of any of aspects 1 through 7, wherein communicating the control signaling comprises: transmitting the time-varying beam correspondence mode indicator to a network entity.

Aspect 9: The method of aspect 8, wherein communicating the time-varying beam correspondence mode indicator comprises: transmitting the time-varying beam correspondence mode indicator based at least in part on a traffic pattern, a traffic load, mobility information, a performance requirement, or any combination thereof.

Aspect 10: The method of any of aspects 1 through 9, wherein the time-varying beam correspondence mode indicator comprises an indication that beam correspondence is absent; and the first set of beam weight values is different from and cannot be derived from the second set of beam weight values.

Aspect 11: The method of aspect 10, further comprising: performing an uplink beam training procedure based at least in part on the indication that beam correspondence is absent, wherein selecting the first set of beam weight values for the uplink beam is based at least in part on the uplink beam training procedure.

Aspect 12: The method of any of aspects 10 through 11, further comprising: selecting the first set of beam weight values is based at least in part on a traffic pattern, a traffic load, mobility information, performance requirements, or any combination thereof.

Aspect 13: The method of any of aspects 1 through 12, wherein the time-varying beam correspondence mode indicator comprises an indication that beam correspondence is present; and the first set of beam weight values is derived from the second set of beam weight values.

Aspect 14: The method of aspect 13, wherein selecting the first set of beam weight values and the second set of beam weight values comprises: selecting one or more beam weights associated with phase control, and setting amplitude control to an on configuration or an off configuration.

Aspect 15: The method of aspect 14, further comprising: setting the amplitude control to the on configuration or the off configuration is based at least in part on one or more conditions satisfying a performance threshold.

Aspect 16: The method of aspect 15, further comprising: receiving an indication of the performance threshold from the network entity.

Aspect 17: The method of any of aspects 15 through 16, wherein the performance threshold is associated with a channel environment, a difference between uplink power and downlink power, a difference between uplink performance and downlink performance, or any combination thereof.

Aspect 18: A method for wireless communications at a network entity, comprising: communicating control signaling comprising a time-varying beam correspondence mode indicator; selecting, based at least in part on the time-varying beam correspondence mode indicator, a beam correspondence mode; and performing wireless communications with a UE using an uplink beam, a downlink beam, or both, according to the beam correspondence mode.

Aspect 19: The method of aspect 18, wherein communicating the control signaling comprises: transmitting the time-varying beam correspondence mode indicator to the UE, the time-varying beam correspondence mode indicator indicating that the UE is instructed to implement beam correspondence in signaling or is permitted to refrain from implementing beam correspondence.

Aspect 20: The method of aspect 19, further comprising: receiving capability information indicating that the UE supports non-codebook-based beam weights different from codebook-based beam weights, and is capable of dynamically switching between two beam correspondence modes, wherein transmitting the time-varying beam correspondence mode indicator is based at least in part on transmitting the capability information.

Aspect 21: The method of aspect 20, further comprising: receiving, in the capability information, an indication of a plurality of supported beam weights comprising a first set of beam weight values associated with an uplink beam and a second set of beam weight values associated with a downlink beam.

Aspect 22: The method of any of aspects 18 through 21, wherein the uplink beam is associated with a first set of beam weight values and the downlink beam is associated with a second set of beam weight values; the first set of beam weight values, the second set of beam weight values, or both, are associated with phase control, amplitude control, or both; and the phase control, amplitude control, or both, are associated with respective quantization levels available in the hardware at the UE.

Aspect 23: The method of aspect 22, further comprising: transmitting an indication of a number of bits associated with the respective quantization levels.

Aspect 24: The method of any of aspects 22 through 23, further comprising: receiving an indication of a number of bits associated with the respective quantization levels.

Aspect 25: The method of any of aspects 18 through 24, wherein communicating the time-varying beam correspondence mode indicator comprises: receiving the time-varying beam correspondence mode indicator based at least in part on a traffic pattern, a traffic load, mobility information, performance requirements, or any combination thereof.

Aspect 26: The method of any of aspects 18 through 25, wherein the time-varying beam correspondence mode indicator comprises an indication that beam correspondence is absent; and the uplink beam is associated with a first set of beam weight values different from and that cannot be derived from a second set of beam weight values associated with the downlink beam.

Aspect 27: The method of any of aspects 18 through 26, wherein the time-varying beam correspondence mode indicator comprises an indication that correspondence is present; and the uplink beam is associated with a first set of beam weight values and the downlink beam is associated with a second set of beam weight values, wherein the first set of beam weight values is derived from the second set of beam weight values.

Aspect 28: An apparatus for wireless communications at a UE, comprising a processor; memory coupled with the processor; and instructions stored in the memory and executable by the processor to cause the apparatus to perform a method of any of aspects 1 through 17.

Aspect 29: An apparatus for wireless communications at a UE, comprising at least one means for performing a method of any of aspects 1 through 17.

Aspect 30: A non-transitory computer-readable medium storing code for wireless communications at a UE, the code comprising instructions executable by a processor to perform a method of any of aspects 1 through 17.

Aspect 31: An apparatus for wireless communications at a network entity, comprising a processor; memory coupled with the processor; and instructions stored in the memory and executable by the processor to cause the apparatus to perform a method of any of aspects 18 through 27.

Aspect 32: An apparatus for wireless communications at a network entity, comprising at least one means for performing a method of any of aspects 18 through 27.

Aspect 33: A non-transitory computer-readable medium storing code for wireless communications at a network entity, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting capability information indicating that the UE supports non-codebook-based beam weights different from codebook-based beam weights and indicating that the UE is capable of dynamically switching between two beam correspondence modes;
   communicating control signaling comprising a time-varying beam correspondence mode indicator that is based at least in part on the capability information;
   selecting, based at least in part on the time-varying beam correspondence mode indicator, a first set of beam weight values for an uplink beam and a second set of beam weight values for a downlink beam, the first set of beam weight values being derived from the second set of beam weight values, wherein the first set of beam weight values, the second set of beam weight values, or both, are associated with phase control and amplitude control, and wherein the amplitude control is set to an on configuration or an off configuration based at least in part on one or more conditions satisfying a performance threshold; and
   performing the wireless communications with a network entity using the uplink beam according to the first set of beam weight values, the downlink beam according to the second set of beam weight values, or both.

2. The method of claim 1, wherein communicating the control signaling comprises:
   receiving the time-varying beam correspondence mode indicator from the network entity indicating that the UE is instructed to implement beam correspondence in signaling or is permitted to refrain from implementing the beam correspondence.

3. The method of claim 1, further comprising:
   transmitting, in the capability information, an indication of a plurality of supported beam weights comprising the first set of beam weight values and the second set of beam weight values.

4. The method of claim 1, wherein:
   the phase control, the amplitude control, or both, are associated with respective quantization levels available in hardware at the UE.

5. The method of claim 4, further comprising:
   receiving an indication of a number of bits associated with the respective quantization levels.

6. The method of claim 4, further comprising:
   transmitting an indication of a number of bits associated with the respective quantization levels.

7. The method of claim 1, wherein communicating the control signaling comprises:
   transmitting the time-varying beam correspondence mode indicator to the network entity.

8. The method of claim 7, wherein communicating the time-varying beam correspondence mode indicator comprises:
   transmitting the time-varying beam correspondence mode indicator based at least in part on a traffic pattern, a traffic load, mobility information, a performance requirement, or any combination thereof.

9. The method of claim 1, wherein:
   the time-varying beam correspondence mode indicator comprises an indication that beam correspondence is absent.

10. The method of claim 9, further comprising:
    performing an uplink beam training procedure based at least in part on the indication that the beam correspondence is absent, wherein selecting the first set of beam weight values for the uplink beam is based at least in part on the uplink beam training procedure.

11. The method of claim 9, further comprising:
    selecting the first set of beam weight values is based at least in part on a traffic pattern, a traffic load, mobility information, performance requirements, or any combination thereof.

12. The method of claim 1, wherein:
    the time-varying beam correspondence mode indicator comprises an indication that beam correspondence is present.

13. The method of claim 1, further comprising:
    receiving an indication of the performance threshold from the network entity.

14. The method of claim 1, wherein the performance threshold is associated with a channel environment, a difference between uplink power and downlink power, a difference between uplink performance and downlink performance, or any combination thereof.

15. A method for wireless communications at a network entity, comprising:
    receiving capability information indicating that a user equipment (UE) supports non-codebook-based beam weights different from codebook-based beam weights and indicating that the UE is capable of dynamically switching between two beam correspondence modes;
    communicating control signaling comprising a time-varying beam correspondence mode indicator that is based at least in part on the capability information;
    selecting, based at least in part on the time-varying beam correspondence mode indicator, a beam correspondence mode; and
    performing the wireless communications with the UE using an uplink beam and a downlink beam, according to the beam correspondence mode, a first set of beam weight values associated with the uplink beam being derived from a second set of beam weight values associated with the downlink beam, wherein the first set of beam weight values, the second set of beam weight values, or both, are associated with phase control and amplitude control, and wherein the amplitude control is based at least in part on one or more conditions satisfying a performance threshold.

16. The method of claim 15, wherein communicating the control signaling comprises:
transmitting the time-varying beam correspondence mode indicator to the UE, the time-varying beam correspondence mode indicator indicating that the UE is instructed to implement beam correspondence in signaling or is permitted to refrain from implementing the beam correspondence.

17. The method of claim 15, further comprising:
receiving, in the capability information, an indication of a plurality of supported beam weights comprising the first set of beam weight values associated with the uplink beam and the second set of beam weight values associated with the downlink beam.

18. The method of claim 15, wherein:
the phase control, the amplitude control, or both, are associated with respective quantization levels available in hardware at the UE.

19. The method of claim 18, further comprising:
transmitting an indication of a number of bits associated with the respective quantization levels.

20. The method of claim 18, further comprising:
receiving an indication of a number of bits associated with the respective quantization levels.

21. The method of claim 15, wherein communicating the time-varying beam correspondence mode indicator comprises:
receiving the time-varying beam correspondence mode indicator based at least in part on a traffic pattern, a traffic load, mobility information, performance requirements, or any combination thereof.

22. The method of claim 15, wherein:
the time-varying beam correspondence mode indicator comprises an indication that beam correspondence is absent; and
the uplink beam is associated with the first set of beam weight values different from the second set of beam weight values associated with the downlink beam.

23. The method of claim 15, wherein:
the time-varying beam correspondence mode indicator comprises an indication that beam correspondence is present.

24. An apparatus for wireless communications at a user equipment (UE), comprising:
a processing system that includes processor circuitry and memory circuitry that stores code, the processing system configured to cause the UE to:
transmit capability information indicating that the UE supports non-codebook-based beam weights different from codebook-based beam weights and indicating that the UE is capable of dynamically switching between two beam correspondence modes;
communicate control signaling comprising a time-varying beam correspondence mode indicator that is based at least in part on the capability information;
select, based at least in part on the time-varying beam correspondence mode indicator, a first set of beam weight values for an uplink beam and a second set of beam weight values for a downlink beam, the first set of beam weight values being derived from the second set of beam weight values, wherein the first set of beam weight values, the second set of beam weight values, or both, are associated with phase control and amplitude control, and wherein the amplitude control is set to an on configuration or an off configuration based at least in part on one or more conditions satisfying a performance threshold; and
perform the wireless communications with a network entity using the uplink beam according to the first set of beam weight values, the downlink beam according to the second set of beam weight values, or both.

25. The apparatus of claim 24, wherein, to communicate the control signaling, the processing system is further configured to cause the apparatus to:
receive the time-varying beam correspondence mode indicator from the network entity indicating that the UE is instructed to implement beam correspondence in signaling or is permitted to refrain from implementing the beam correspondence.

26. An apparatus for wireless communications at a network entity, comprising:
a processing system that includes processor circuitry and memory circuitry that stores code, the processing system configured to cause the network entity to:
receive capability information indicating that a user equipment (UE) supports non-codebook-based beam weights different from codebook-based beam weights and indicating that the UE is capable of dynamically switching between two beam correspondence modes;
communicate control signaling comprising a time-varying beam correspondence mode indicator that is based at least in part on the capability information;
select, based at least in part on the time-varying beam correspondence mode indicator, a beam correspondence mode; and
perform the wireless communications with the UE using an uplink beam and a downlink beam, according to the beam correspondence mode, a first set of beam weight values associated with the uplink beam being derived from a second set of beam weight values associated with the downlink beam, wherein the first set of beam weight values, the second set of beam weight values, or both, are associated with phase control and amplitude control, and wherein the amplitude control is based at least in part on one or more conditions satisfying a performance threshold.

* * * * *